United States Patent
Schiffman

(10) Patent No.: US 9,762,612 B1
(45) Date of Patent: Sep. 12, 2017

(54) SYSTEM AND METHOD FOR NEAR REAL TIME DETECTION OF DOMAIN NAME IMPERSONATION

(71) Applicant: FARSIGHT SECURITY, INC., San Mateo, CA (US)

(72) Inventor: Michael Schiffman, Henderson, NV (US)

(73) Assignee: FARSIGHT SECURITY, INC., San Mateo, CA (US)

( * ) Notice: Subject to any disclaimer, the term of this patent is extended or adjusted under 35 U.S.C. 154(b) by 0 days.

(21) Appl. No.: 15/598,023

(22) Filed: May 17, 2017

(51) Int. Cl.
- *H04L 29/06* (2006.01)
- *H04L 29/12* (2006.01)
- *H04L 12/24* (2006.01)
- *G06F 17/30* (2006.01)

(52) U.S. Cl.
CPC .... *H04L 63/1483* (2013.01); *G06F 17/30985* (2013.01); *H04L 41/0631* (2013.01); *H04L 61/10* (2013.01); *H04L 61/1511* (2013.01); *H04L 61/301* (2013.01); *H04L 65/10* (2013.01)

(58) Field of Classification Search
None
See application file for complete search history.

(56) References Cited

U.S. PATENT DOCUMENTS

| | | | | |
|---|---|---|---|---|
| 8,880,686 | B2* | 11/2014 | McPherson | H04L 61/1511 709/223 |
| 9,276,956 | B2* | 3/2016 | Geng | G06F 21/51 |
| 2011/0231502 | A1* | 9/2011 | Umeshima | H04L 51/12 709/206 |
| 2012/0054860 | A1* | 3/2012 | Wyschogrod | H04L 29/12066 726/22 |
| 2013/0318603 | A1* | 11/2013 | Merza | H04L 63/1441 726/22 |
| 2015/0058999 | A1* | 2/2015 | McPherson | H04L 61/1511 726/26 |
| 2017/0026390 | A1* | 1/2017 | Sofka | H04L 63/1416 |
| 2017/0041333 | A1* | 2/2017 | Mahjoub | H04L 61/1511 |
| 2017/0093802 | A1* | 3/2017 | Norum | H04L 63/0428 |

* cited by examiner

*Primary Examiner* — Christopher Revak
(74) *Attorney, Agent, or Firm* — Sterne, Kessler, Goldstein & Fox P.L.L.C.

(57) ABSTRACT

Systems and methods are described for detecting domain name impersonation in the domain name system (DNS). A nefarious party may register a domain name in the DNS that impersonates a domain name associated with a company in an attempt to lure users to malicious destination network addresses based on their trust of that company. This may lead to the dilution of the company's online presence as its domains come to be associated with malicious activity. In embodiments, a system is described which receives inputs from a subscriber including the domain names the subscriber wishes to protect, ignore, or give special scrutiny to. The system receives instances of domain names registered in the DNS and performs methods to determine if the domain name is attempting to impersonate the domain names of the subscriber. Alerts are generated so that the subscriber may take corrective action.

27 Claims, 13 Drawing Sheets

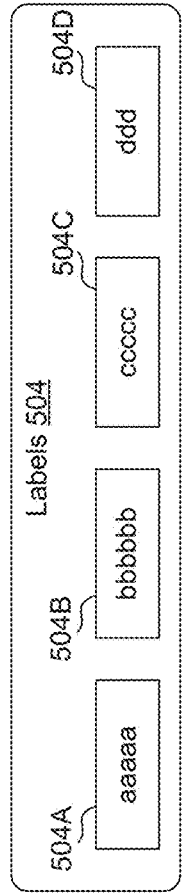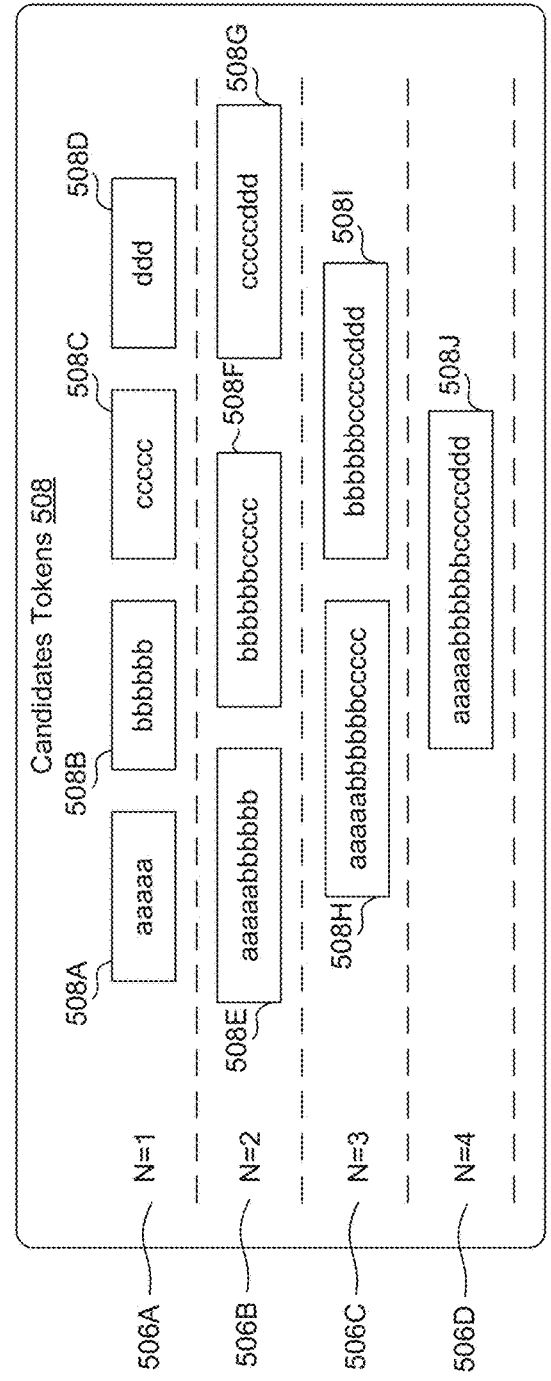
FIG. 5

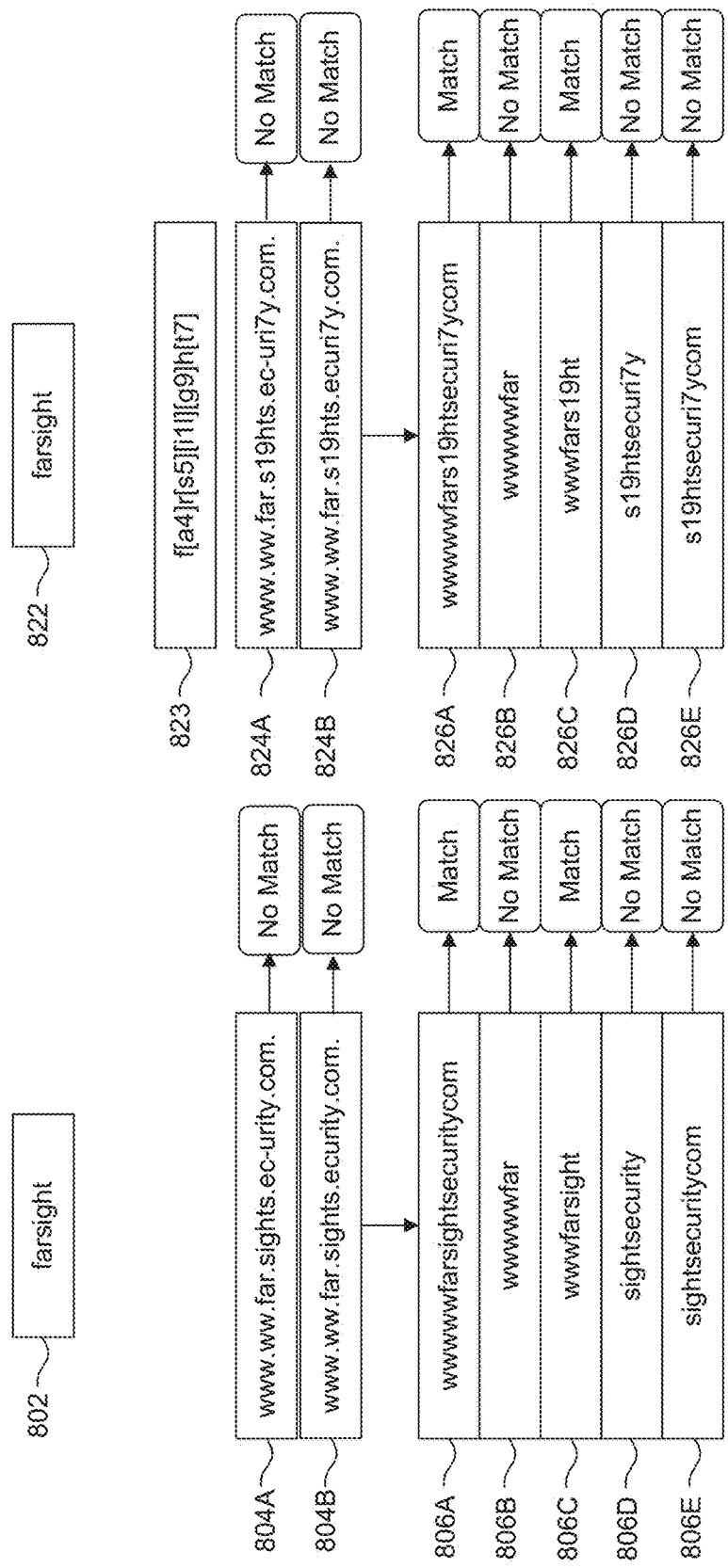

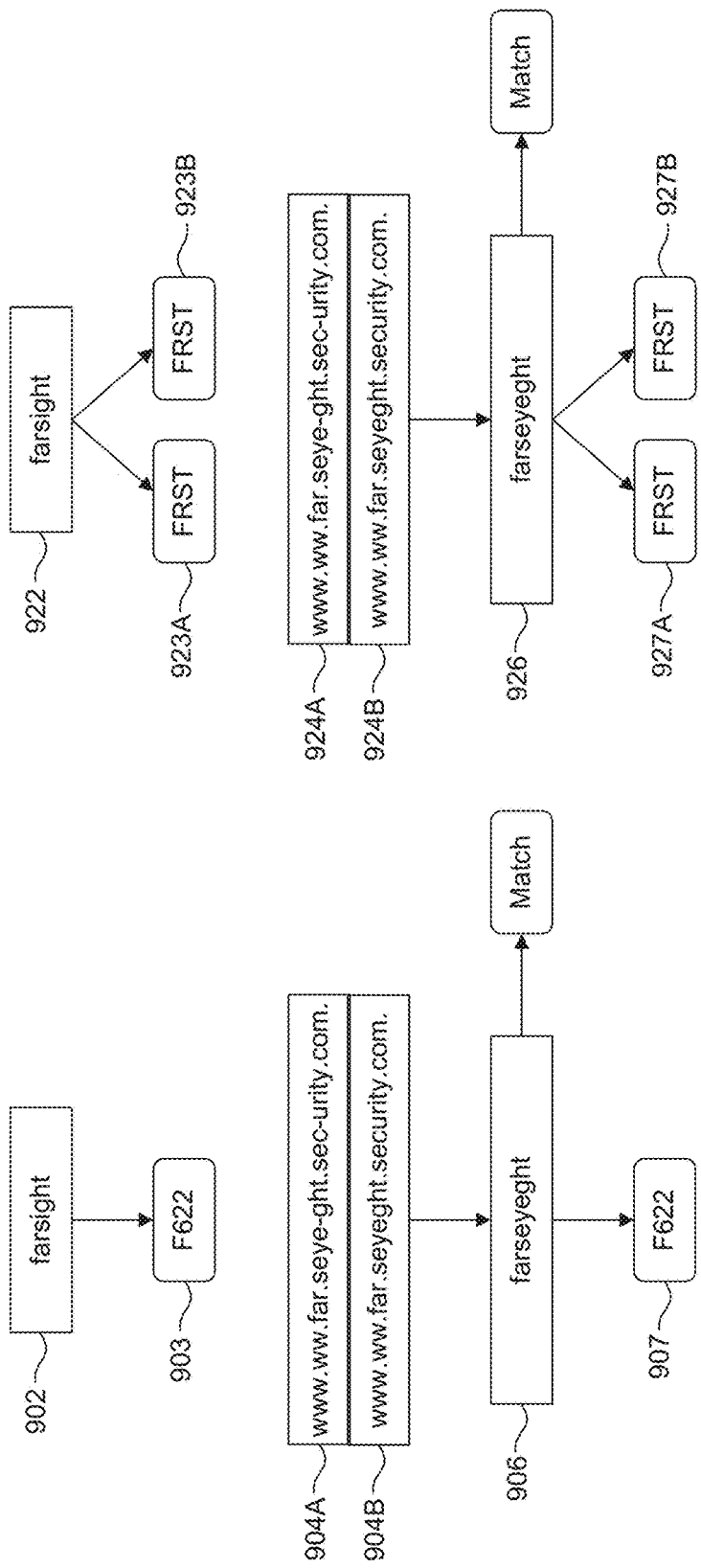

SYSTEM AND METHOD FOR NEAR REAL TIME DETECTION OF DOMAIN NAME IMPERSONATION

BACKGROUND

Field

This field is generally related to the domain name system (DNS) and domain name impersonation.

Related Art

A communication network allows data to be transferred between two different locations. To transmit data over a network, the data is often divided into pieces, known as packets or blocks. Each packet or block may have a destination network address, such as an internet protocol (IP) address that indicates a destination of the packet and intermediate forwarding devices where the packet should be routed. These addresses are typically numerical, difficult to remember, and may frequently change. Because of this difficulty, these addresses are frequently associated with a "domain name," a readable string that is typically associated with the owner of one of the addresses. A domain name consists of substrings called "labels" which are delimited by dots, such as "www.example.com.", where "www", "example", and "com" are the labels. When typed into a networking application, such as a web browser, the domain name is translated into an IP address that represents the true form of the destination network address. For example, the Google search engine is associated with a fully qualified domain name (FQDN) "www.google.com.", and when typed into a web browser, this domain name may be translated into a numerical IP address such as "192.168.1.0".

The DNS is the system that enables this translation. The DNS stores mappings between domain names and their respective IP addresses, tracks any changes in the mappings where domain names may be remapped to different IP addresses or vice versa, and performs the translation of a domain name to an IP address. The DNS is thus often referred to as a "phone book" for the internet, where domain names and their respective IP addresses are stored. The DNS translates domain names to IP addresses at the behest of a network application such as a web browser, so that a user of the network application can simply remember a domain name rather than a numerical IP address. The DNS may divide the domain space into a hierarchy with different organizations controlling different portions of the hierarchy. In different portions of the hierarchy, different name servers may store resource records that map domain names to network addresses.

To look up a network address from a domain name, the DNS may use resolvers that execute a sequence of queries to different name servers. For example, the sequence of queries to resolve www.example.com may start at the root name server, which indicates the address of the name server for the gTLD ".com". Then, the DNS resolver may query the name server for the ".com" domain for the address of the name server for example.com. Then, the DNS resolver may query the name server for example.com for the address of www.example.com. In practice, so that a resolver does not need to go through the entire sequence for each request, the resolver may cache the addresses of the various name servers.

The DNS is subject to significant security concerns because of both the age of the DNS and the ingenuity of nefarious parties. In particular, creating a new entry in the DNS is fairly unregulated. A party may register a domain name and its respective IP address through a number of domain name registrar services, which are essentially private businesses that are certified to create new records in the DNS that map IP addresses and new domain names. Many new domain names are registered every day. Some domain names are registered for malicious purposes.

One of these malicious purposes can be broadly termed "domain name impersonation," in which a nefarious party may register a new domain name in an attempt to fool common internet users into believing that the new domain name is associated with some well-known company or brand name. By impersonating a well-known entity, the nefarious party may trick internet users into directing their traffic to the party's own website or other server, where an illicit activity may be performed. When a user attempts to access that domain name, the DNS may translate that domain name to a network address (such as an IP address) that is completely unexpected by the user and that may exist for nefarious purposes.

The nefarious purposes could include introducing malware into the user's computer system or perpetrating a type of Internet-based confidence scam known as "phishing". A phishing website may provide the appearance of a legitimate company to trick the user into revealing confidential personal information, such as passwords and credit card numbers. These nefarious actions can dilute the brand value of a particular company as their brand name and online presence comes to be thought of as untrustworthy.

Domain name impersonation can take on many forms that are designed to fool users with different tactics. For example, a nefarious party may register a new domain name that includes extraneous characters such as dashes of an otherwise well-known domain name. For example, a legitimate domain name "www.coca-cola.com" may be impersonated by another domain name with the same letters and additional dash characters, such as "www.co-ca-col-a.com". A nefarious party may register a domain name that, when read, has a similar pronunciation to a brand name, e.g. "www.koka-kola.com". In another instance, a domain name may be registered that replaces characters with different characters with a similar appearance, such as replacing a character for the letter "l" with character for the number "1". This problem is also further compounded by the more recent advances towards internationalized domain names (IDNs), where characters from non-Latin alphabets may also be used in domain names and are translatable by the DNS. In all cases, these domain names may translate to IP addresses that may perform nefarious actions on the user visiting them.

Thus, systems and methods are needed to detect potential instances of domain name impersonation of a company's brands and domain names.

BRIEF SUMMARY

In an embodiment, a system is disclosed that determines whether a domain name newly registered with the DNS is impersonating a subscriber brand or subscriber domain name. A filter module first determines whether the domain name matches an entry in an allowed domain name list. If the domain name does not match an entry in the list, the domain name is passed to a preprocessing module that removes extraneous characters to generate a processed domain name string. The processed domain name string is then passed to a tokenizer module that generates a candidate string based on the processed domain name string. A match engine then receives the candidate string and determines if the candidate string matches the subscriber brand or domain by processing both strings by one of many matching algorithms. If a criteria is satisfied based on that processing, the candidate string and subscriber brand match, and the match engine generates an alert report to be sent to the subscriber.

Method and computer program product embodiments are also disclosed.

The drawing in which an element first appears is typically indicated by the leftmost digit or digits in the corresponding reference number. In the drawings, like reference numbers may indicate identical or functionally similar elements.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

FIG. 5 illustrates an example of how a set of strings is preprocessed.

FIGS. 8A-B illustrate a class of algorithms that looks for literal matches between strings, according to embodiments.

FIGS. 9A-B illustrate a class of algorithms that looks for phonetic matches between strings according to embodiments.

The drawing in which an element first appears is typically indicated by the leftmost digit or digits in the corresponding reference number. In the drawings, like reference numbers may indicate identical or functionally similar elements.

DETAILED DESCRIPTION

Figure 1:
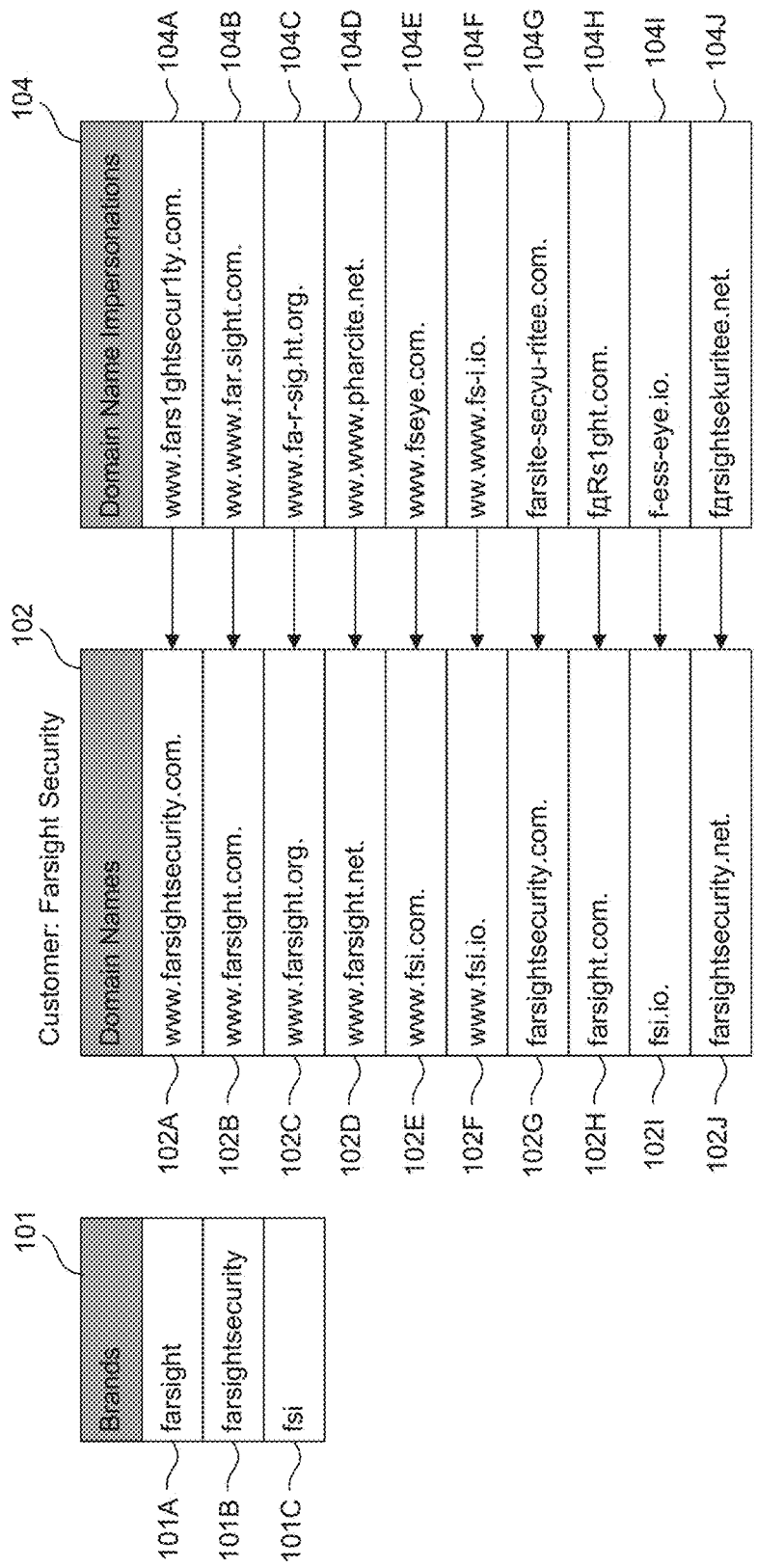
FIG. 1 illustrates DNS name impersonation, according to an embodiment.

The system allows a company, also called a subscriber, to initiate a service to detect any attempts by a nefarious party to look up FQDNs within the DNS that may imitate the subscriber's well-known brands and domain names. In embodiments, the subscriber may enter pertinent information related to their brands, such as the brands themselves expressed as character strings, known domain name spaces that the subscriber may own and therefore not want to monitor, and domain spaces that the subscriber specifically wants monitored for potential brand impersonators. When impersonations are detected, the system generates alert reports and sends them to a subscriber so that they can be notified of potential impersonators and take any corrective steps.

Notification may occur in real time or near-real time. A DNS sensor node array delivers DNS records containing FQDNs in real time. The DNS sensor nodes passively observe DNS queries and responses resolved by DNS servers and resolvers, and record them. These sensor nodes may be placed at strategic observation points in various networks around the world. They may be in production networks at Internet service providers (ISPs), Internet exchanges, Internet cloud service operators, prominent social networks, universities, and large corporations. The DNS data observed by these sensor nodes enables the creation of a feed of newly observed DNS records that delivers DNS records to various destinations mere seconds after they are first observed. Because of this feed, the system disclosed may receive DNS records in real time and may process them to determine if they represent domain name impersonation attempts within a matter of seconds. In this way, the system may detect any instances of DNS impersonation in real time or near real time.

Not only can detection occur in real time, embodiments may improve the breadth and quality of the DNS impersonation detection. To improve the quality of detection, the system employs several sophisticated techniques. The system preprocesses newly received FQDNs to tokenize them, obtaining numerous candidate tokens. The tokenization process can remove chaff introduced by a nefarious party, and the resulting candidate tokens more fully expose substrings within the FQDN that may trick an internet user into believing the FQDN is representative of the subscriber brand. By more fully exposing these substrings, preprocessing and tokenization may improve the system's ability to detect subscriber brand impersonation.

The system applies numerous algorithms to the candidate tokens to match them with some criteria. These algorithms compare subscriber brands and the various candidate strings generated by the preprocessing apparatus to determine whether an FQDN is attempting to impersonate the subscriber's brands. Algorithms are grouped into three separate groups, including literal algorithms, phonetic algorithms, and homoglyph algorithms. Literal algorithms look for substring matches or full string matches within FQDNs that match subscriber brands. The phonetic algorithms look for candidate tokens that may be pronounced similarly to the subscriber brands, thus tricking internet users into believing the impersonating FQDN is representative of the brand. The homoglyph algorithms look for strings that are visually close to the subscriber brands.

One homoglyph algorithm in particular, the internationalized domain name (IDN) Homograph algorithm, detects internationalized domain names (IDNs) that attempt to impersonate a subscriber brand by employing non-Latin characters (such as Cyrillic or Greek characters) that have a similar appearance to domestic characters. In an embodiment, the IDN Homograph algorithm generates substitute strings based on the subscriber brand that replace some Latin characters within the subscriber brand with non-Latin characters, and uses these substitute strings to perform comparisons against the candidate tokens generated based on the received IDN.

The detailed description is divided into three sections. First, embodiments of a system for receiving, parsing, and detecting potential DNS name impersonation are described with respect to FIG. 1 and FIGS. 2A-B. Second, embodiments of a preprocessing system and method that generate multiple impersonation candidates from a single DNS name are described with respect to FIGS. 4-6. Finally, embodiments of the match engine and the matching algorithms are described with respect to FIGS. 7, 8A-B, 9A-B, and 10A-B.

A. DNS IMPERSONATION DETECTION SYSTEM

FIG. 1 illustrates the problem of DNS name impersonation. DNS name impersonation, as described above, is an attempt by nefarious parties to register domain names in the DNS that can be mistaken for domain names or brands of a well-known company in an attempt to fool the public at large for nefarious purposes. This can damage the brands of a company as it may lead the public to be weary of websites and online services offered by that company.

A company may wish to protect FQDNs that it has registered with the DNS through a domain name registrar. Domain names that are similar in appearance or pronunciation to those FQDNs may fool the public into believing that those domain names are also associated with the company, when in fact they exist only for nefarious purposes such as resolving to illicit websites hosting malware or email phishing scams. At the same time, the public may associate the company with some FQDNs that the company has not registered with the DNS due to similarities in services or brand names and slogans used by the company. For example, people may associate a company with an acronym similar to that company's title or a slogan appearing in an advertisement for that company, even if the company has not registered domain names with a similar appearance in the DNS. Unscrupulous parties may register domain names similar in appearance or pronunciation to both the registered FQDNs and the un-registered but company-associated names and phrases in an attempt to fool unsuspecting people into believing that the company is associated with that domain name. In such cases, the company may wish to detect when domain names that could be mistaken for their own are registered in the DNS.

FIG. 1 illustrates an example of this scenario. In FIG. 1, a company called "Farsight Security Incorporated" may have list of brands that are associated with the company as well as a list of Internet-facing FQDNs representing these brands. FIG. 1 illustrates a brandlist 101 and an FQDN list 102. Each member of both the brandlist 101 and the FQDN list 102 is expressed as an American Standard Code for Information Interchange (ASCII) string. For the purpose of this figure, the members of these lists are referred to as entries. Entry 102A of FQDN list 102 may be the FQDN representing the company's main website, in this case "www.farsightsecurity.com." FQDN list 102 may include entries 102B-D that include similar FQDNs that the company has registered with the DNS that have different gTLDs such as ".com", ".net", and ".org." The FQDN list 102 may also include entries 102E-F with acronyms associated with the company such as "fsi". Finally, the list may contain similar entries 102G-J that represent website names or email addresses that the company feels may be associated with their company in the eyes of the public.

List 104 contains FQDNs that may be mistaken for corresponding names in the FQDN list 102. This list is only meant to illustrate the potential for domain name impersonation and should not be considered limiting. List 104 illustrates various approaches to domain name impersonation that may succeed in tricking people into believing these domain names are associated with the company. While the cases represented in list 104 mostly represent a single technique that may be used by scammers, these techniques are often used in combination.

A simple technique is the replacement of characters with different characters having a similar appearance. Entry 104A, for example, replaces letter characters with numeric characters with similar appearances, for example replacing the letter "l" with the number "1," to impersonate entry 102A in FQDN list 102.

Another technique may add extraneous subdomains, delineated by dots, or, within the subdomains, add extraneous characters such as dashes that, when read, do not seem to detract from being read as the domain names. For example, entries 104B, 104C, and 104F add both periods and dashes to domain names that would otherwise contain nearly identical characters to entries 102B, 102C, and 102F respectively that the company wishes to protect. Entry 104C, "www.fa-r-sig.ht.org.", contains all of the letters of entry 102C, "www.farsight.org.", but is a different registered domain name with the DNS and therefore may resolve to a different and potentially harmful IP address.

Yet another technique is to register domain names that are pronounced similarly to legitimate domain names. Entries 104D, 104E, 104G, and 104I represent domain names that when read may be pronounced similar to entries 102D, 102E, 102G and 102I respectively. Entry 104D, for example, replaces a letter "f" with the letter combination "ph" to imitate the pronunciation of the word "farsight," but could be registered in the DNS to resolve to a different IP address.

Finally, entries 104H and 104J contain characters from foreign scripts, such as Cyrillic script, that may be mistaken for Latin characters with similar appearance, such as the Cyrillic letter "A" in place of the letter "a." Several characters in Cyrillic and Greek are nearly identical in appearance, but are not recognized as homoglyphs by the DNS. As such, these domain names may trick unsuspecting people into accessing a destination with potentially nefarious purposes. The Internationalized Domain Names in Applications (IDNA) system allows for strings containing these characters to be translatable in the DNS via a system for encoding Unicode glyphs in ASCII called "Punycode".

It should be noted that not all of these domain names may be associated with nefarious parties. Legitimate entities may register domain names that are similar to those associated with the company. As such, not all of the names detected by embodiments of the present disclosure may result in actionable alerts. An objective of the systems and methods described in the present disclosure is generating alerts to send to the company when the system detects an attempted impersonation of the company's domain names and brands. The companies that register with that service can then determine what actions, if any, should be taken to prevent impersonation of their brands and domain names.

Figure 2A:
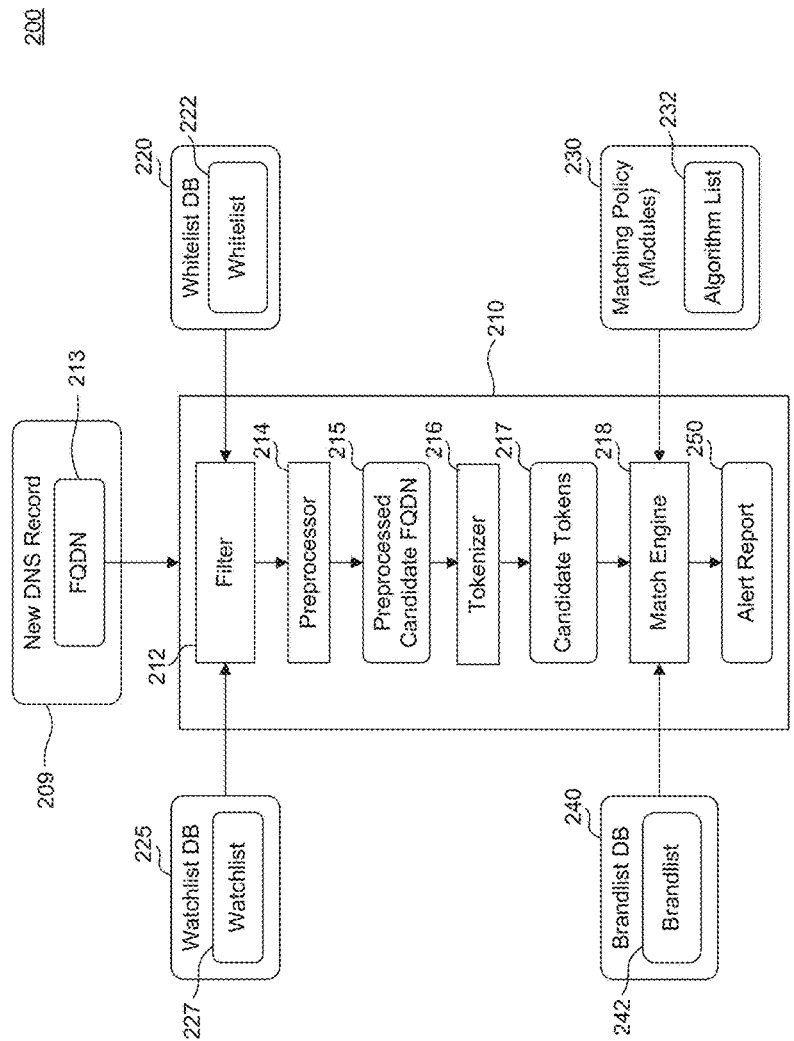
FIGS. 2A-B illustrate a system for detecting DNS name impersonation, according to an embodiment.

FIG. 2A is a diagram of system 200 for detecting domain name impersonation. In an embodiment, system 200 comprises domain name whitelist database 220, watchlist database 225, brandlist database 240, matching policy database 230, and match detection system 210. Match detection system 210 comprises several functional modules including filter module 212, FQDN preprocessor 214, tokenizer 216, and match engine 218. Preprocessor 214 outputs a preprocessed candidate FQDN 215, tokenizer 216 outputs candidate tokens 217, and match engine 218 outputs alert report 250.

In an embodiment, a subscriber, such as a company or organization, subscribes to a domain name impersonation detection service that system 200 performs. The subscriber inputs a set of parameters of the service it wishes to receive from the system 200, including brand names to protect, domain space to monitor, domain names and wildcards to ignore, a set of matching algorithms to use in detecting DNS name impersonation, and a level of sensitivity when detecting potential domain name impersonations. These parameters are expressed in brandlist 242, whitelist 222, watchlist 227, and algorithm list 232, which are stored respectively in brandlist database 240, whitelist database 220, watchlist database 225, and matching policy database 230. The databases feed these parameters into the various modules of match detection system 210 to perform the service as specified. In embodiments, a number of different configurations may be applied to these databases: all may be contained on a single server device or server device cluster, they may be contained on separate server devices, or they may be contained on the same server device or cluster along with the entirety of match detection system detection system 210. These embodiments are non-limiting, and a skilled artisan would recognize that several configurations for these databases are possible.

In an exemplary embodiment, match detection system 210 performs the steps required to detect potential domain name impersonation for a subscriber, using inputs from whitelist 222, watchlist 227, brandlist 242 and algorithm list 232. In embodiments, the various modules of match detection system 210 can be implemented on a server device or server device cluster, on separate server devices, or even in a commercial cloud data center such as Amazon Web Services (AWS). A skilled artisan would recognize that any of these implementations, and many not enumerated here, would be appropriate for implementing match detection system 210. The functions of the different modules of match detection system 210 are briefly described here, with more detailed discussion provided below.

DNS resource records may be received from an array of DNS sensor nodes. This data provides a snapshot of DNS configuration and content data as it is being consumed on the internet, in real time. DNS resource records may be decomposed into multiple Resource Record Sets (RRsets). An RRset may include one or more DNS resource records (RR). An RR may be a single DNS record, and may include several fields. These fields include:

- an owner name field, which may specify an FQDN such as www.example.com for which a DNS query was generated;
- a time to live (TTL) field, which may indicate an amount of time in seconds that the RR may be cached.
- a class field, which may indicate a protocol family or an instance of the protocol such as "IN" for internet protocol.
- a type field, which may indicate a type of the DNS record. An example of an RR type is type "A" ("address") which indicates that the DNS record maps an FQDN to an IPv4 address. As another example, an RR type "AAAA" ("IPv6 address") indicates that the DNS record maps an FQDN to an IPv6 address.
- type-specific data, such as an IP address mapped to the queried FQDN.

In an example, a DNS record may map an FQDN to an IP address. An RRset may be a set of all the resource records of a given type for a given domain. For example, multiple RRs may map a FQDN such as "www.example.com." to multiple different IPv4 address. In this example, the RRset for "www.example.com." contains all of these IPv4 addresses.

As was discussed above, a DNS sensor node array observes new DNS records, and the system disclosed uses these DNS records to perform the domain name impersonation detection. The DNS sensor nodes of the DNS sensor node array observe and record DNS queries resolved by DNS servers and resolvers. The DNS sensor nodes may then send the DNS records to various destinations for further processing. These sensor nodes are placed at strategic observation points such as production networks at Internet service providers (ISPs), Internet exchanges, Internet cloud service operators, prominent social networks, universities, and large corporations. These sensor nodes create a feed of newly observed DNS records that can deliver DNS records to various destinations mere seconds after they are first observed. Because of this feed, the system disclosed may receive DNS records in real time, and processes them to determine if they represent domain name impersonation attempts within a matter of seconds.

Filter module 212 is the first module in match detection system 210 to receive new DNS record 209. In an embodiment, filter module 212 may employ a dedicated communication port, such as a universal datagram protocol (UDP) port, to listen for a new DNS record that may be received from the DNS sensor node array described above. Filter module 212 may receive DNS record 209 and determine if the DNS record is of interest. Only certain types of DNS records are of interest when detecting domain name impersonation, such as Address Records (A), IPv6 Address records (AAAA), Pointer Records (PTR), Canonical Name records (CNAME), and Mail Exchange records (MX). All of these records may be for services of different types. These will be discussed in further detail below. In another embodiment, only DNS records which have already been determined to be of interest are received at system 200.

The watchlist database 225 stores a subscriber's watchlist 227 specifying domain names that the subscriber wants system 200 to consider when determining potentially infringing domain names. In embodiments, a subscriber may only want to consider part of the domain name space, such as any domain name in a single gTLD such as ".com." In such cases, the subscriber may specify "*.com" as its entry so that system 200 only considers FQDNs in the ".com" top level domain. Optionally, the subscriber may not specify any specific domain name space to watch, and the entry in watchlist database 225 for that particular subscriber defaults to "*.", signifying that any FQDN 213 should be considered. These strings are stored in watchlist 227, and the watchlist is fed into filter module 212 such that filter module 212 may check FQDN 213. Similar to the whitelist 222, in an embodiment FQDN 213 must be either an exact match against one of the full FQDNs specified in watchlist 222, or a match against a wildcard entry in watchlist 227, to be passed on to the other elements of the match detection system 210.

As discussed above, whitelist database 220 stores whitelist 222 specifying domain names that the subscriber wants to ignore. Some domain names that are newly registered in the DNS may reflect legitimate or otherwise non-malicious domain names due to a company with a similar brand name or acronym, the subscriber having a company name that may also be similar to some kind of common phrase, etc. Furthermore, a subscriber may simply own a large portion of the domain name space (e.g. Bank of America may own any domain name ending in "bofa.com"), and would not want to receive alerts of potential domain name impersonation for new domain names which the company itself is registering with the DNS. In an embodiment, the entries entered by the subscriber may be in the form of FQDNs, partial domain names, or even wildcard character strings that represent domain names, brands, or phrases that the subscriber would like the system 200 to disregard. The entries are stored in whitelist 222, which is fed into filter module 212 of match detection system 210. The filter module 212 may then check to see if FQDN 213 from DNS record 209 matches any of the whitelist entries from the subscriber, and disregard any records that produce a match.

To be ignored by match detection system 210, FQDN 213 must, in an embodiment, be either an exact match against one of the full FQDNs specified in whitelist 222, or a perfectly formatted match against a wildcard entry in whitelist 222. This is because an objective of match detection system 210 is to detect FQDNs that are close to, but not exact matches of, domain names and brands associated with or owned by the subscriber, as these are most likely attempts by some nefarious party to impersonate the subscriber's domain names or brands.

Thus, filter module 212 receives the whitelist 222 and the watchlist 227 from whitelist database 220 and watchlist database 225 respectively, and determines if FQDN 213 stored in new DNS record 209 matches with an entry on either list. In an exemplary embodiment, filter module 212 first determines if FQDN 213 matches an entry on watchlist 227, where if a match is not detected, FQDN 213 is discarded. If a match is detected, filter module 212 then determines if FQDN 213 matches an entry on whitelist 222, where if no match is detected, FQDN 213 is then passed on to the FQDN preprocessor 214 for further investigation, and if a match is detected, FQDN 213 is discarded. In other embodiments, the order of this matching may be reversed.

FQDN preprocessor 214 preprocesses FQDN 213 of DNS record 209 and generates a preprocessed candidate FQDN 215 that is submitted to tokenizer 216. FQDN preprocessor 214 preprocesses FQDN 213 to remove certain characters that are known to defeat naïve pattern matching algorithms. Preprocessed candidate FQDN 215 is submitted to the tokenizer 216 which generates candidate tokens 217. The tokenizer 216 will be described in greater detail below with respect to FIGS. 4-6. In an embodiment, the FQDN preprocessor 214 removes dash characters, which are the most common chaff character that is added to FQDNs to fool pattern matchers. Thus, an FQDN 213 of "www.fars-1ght-secyu.ritee.com." would be converted to a preprocessed candidate FQDN 215 of "www.fars1ghtsecyu.ritee.com." The candidate tokens 217 as well as the preprocessed candidate FQDN 215 may be passed to match engine 218. Match engine 218 loads and runs a number of match engine modules that implement matching algorithms that compare the preprocessed candidate FQDN 215 as well as candidate tokens 217 to the entries of brandlist 242. If a match is detected between any of the candidates and the subscriber-specified brands, an alert report 250 is generated and sent to the subscriber specifying the FQDN 213 and other information related to the detection. Match engine 218 and the matching algorithms are described in greater detail below with respect to FIG. 7, FIGS. 8A-B, FIGS. 9A-B, and FIGS. 10A-B.

Brandlist database 240 stores a brandlist 242 that contains subscriber brands expressed as ASCII strings that the subscriber wants system 200 to investigate for domain name impersonation. In an embodiment, the subscriber may specify brands that are stored in brandlist 240 and fed into the match engine 218. After a preprocessed candidate FQDN 215 and any candidate tokens 217 are obtained, they are passed to match engine 218 to be compared against the entries in brandlist 242. If a match is detected, an alert report 250 is generated.

Matching policy database 230 stores an algorithm list 232 specifying the subscriber's choices for which matching algorithms match engine 218 should utilize in determining matches. Match engine 218 is capable of running several different types of string matching algorithms that attempt to match entries specified by the subscriber in the brandlist 242 (stored in brandlist database 240) against the preprocessed candidate FQDN 215 and candidate tokens 217. Upon initiating the service, the subscriber may specify a subset of the available matching algorithms to be executed by match engine 218, or may simply choose all of the algorithms such that match engine 218 runs the entire set of available matching algorithms to compare the entries in brandlist 242 to preprocessed candidate FQDN 215 and candidate tokens 217.

Figure 2B:
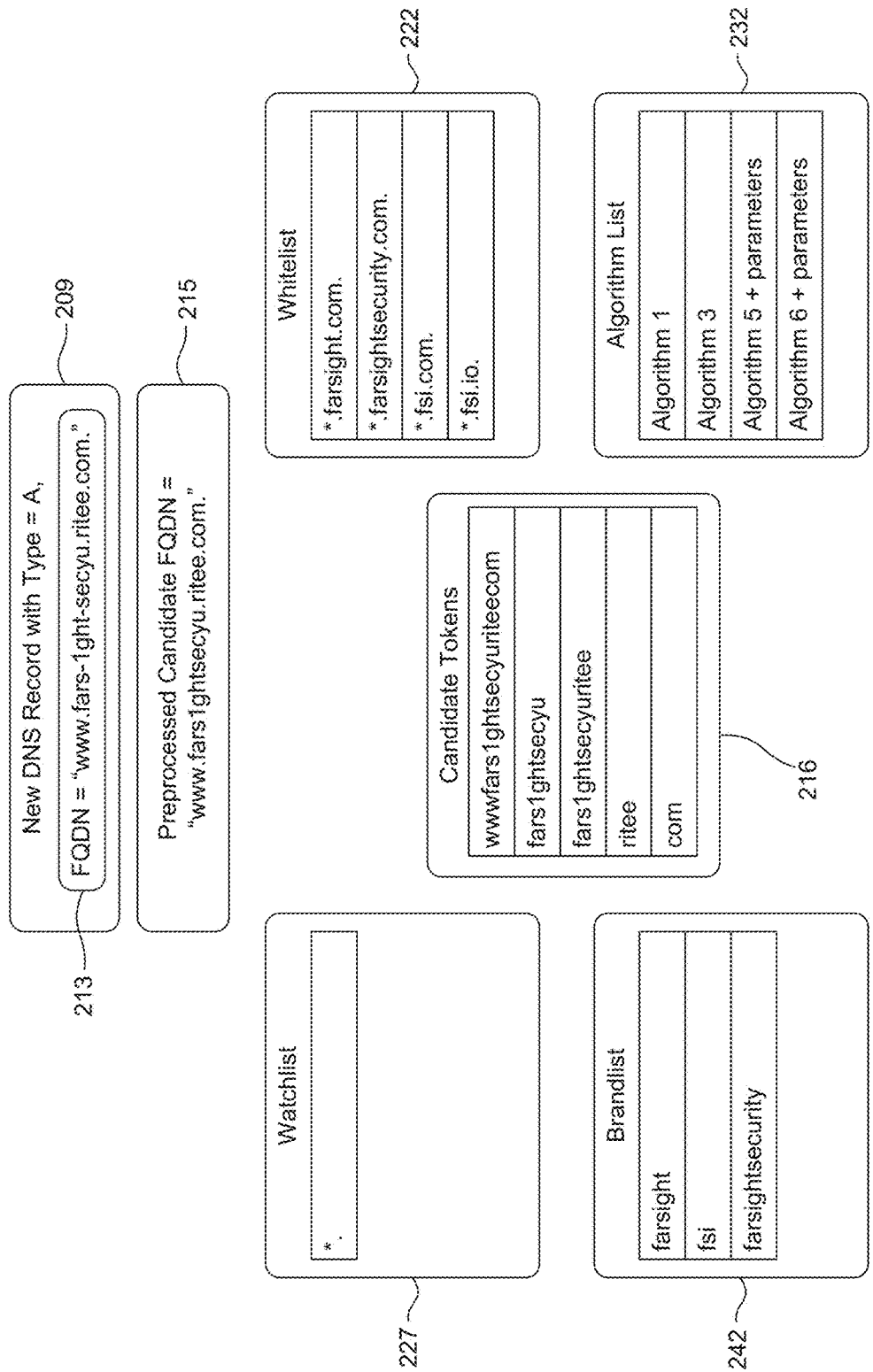

FIG. 2B illustrates an example of the subscriber preferences that may be stored in the databases of system 200. FIG. 2B illustrates a new DNS record 209 with FQDN 213, preprocessed candidate FQDN 215, watchlist 227, whitelist 222, candidate tokens 217, brandlist 242, and algorithm list 232.

Referring again to the example of a subscriber called "Farsight Security", the entries may be as follows. Watchlist 227 may simply contain "*." to represent that no restrictions should be placed on what FQDNs are to be scrutinized by match detection system 210. An FQDN 213 such as "www-.fars-1ghtsecyu.ritee.com", which does not match any entry in the whitelist 222 and does match the "*." entry in watchlist 227, would be passed by the filter module 212 to the next stage of the system 200. The whitelist 222, which as described above specifies a list of domain names and wildcards which should be ignored by system 200, may contain several domain names that are either owned by the company Farsight Security or by other legitimate entities with the word "Farsight" in their name. Therefore, whitelist 222 may contain their main website FQDN, "www.farsightsecurity.com.", wildcard entries "*.farsight.com" and "*.farsightsecurity.com", and a few other entries that represent domain names known to the company. If a new DNS record 209 with FQDN 213 is received by match detection system 210, the filter module will determine if the DNS record 209 is of interest to the match engine, extract the FQDN 213, and compare it against whitelist 222. If the FQDN matches one of the entries in the whitelist (or a pattern dictated by wildcard entries in the whitelist), record 209 is disregarded.

Brandlist 242 includes brand names which the subscriber may wish to protect. After FQDN preprocessor 214 generates preprocessed candidate FQDN 215, tokenizer 216 receives preprocessed candidate FQDN 215 and generates candidate tokens 217, and both preprocessed candidate FQDN 215 and candidate tokens 217 may be compared against the entries in brandlist 242 in match engine 218 depicted in FIG. 2A. Brandlist 242 should contain ASCII character strings such as "fsi" and "farsightsecurity".

Finally, algorithm list 232 contains the matching algorithms that match engine 218 uses when comparing preprocessed candidate FQDN 215 and candidate tokens 217 against the entries in brandlist 242. The subscriber is given the choice of which matching algorithms it wants the match engine to use. In algorithm list 232 shown in FIG. 2B, there may be only four algorithms specified even though there are more algorithms available. In some embodiments, some of the algorithms may also require parameters specific to that algorithm, which may also be stored in algorithm list 232. The match engine 218 and the matching algorithms available in system 200 will be discussed in more detail below.

Figure 3:
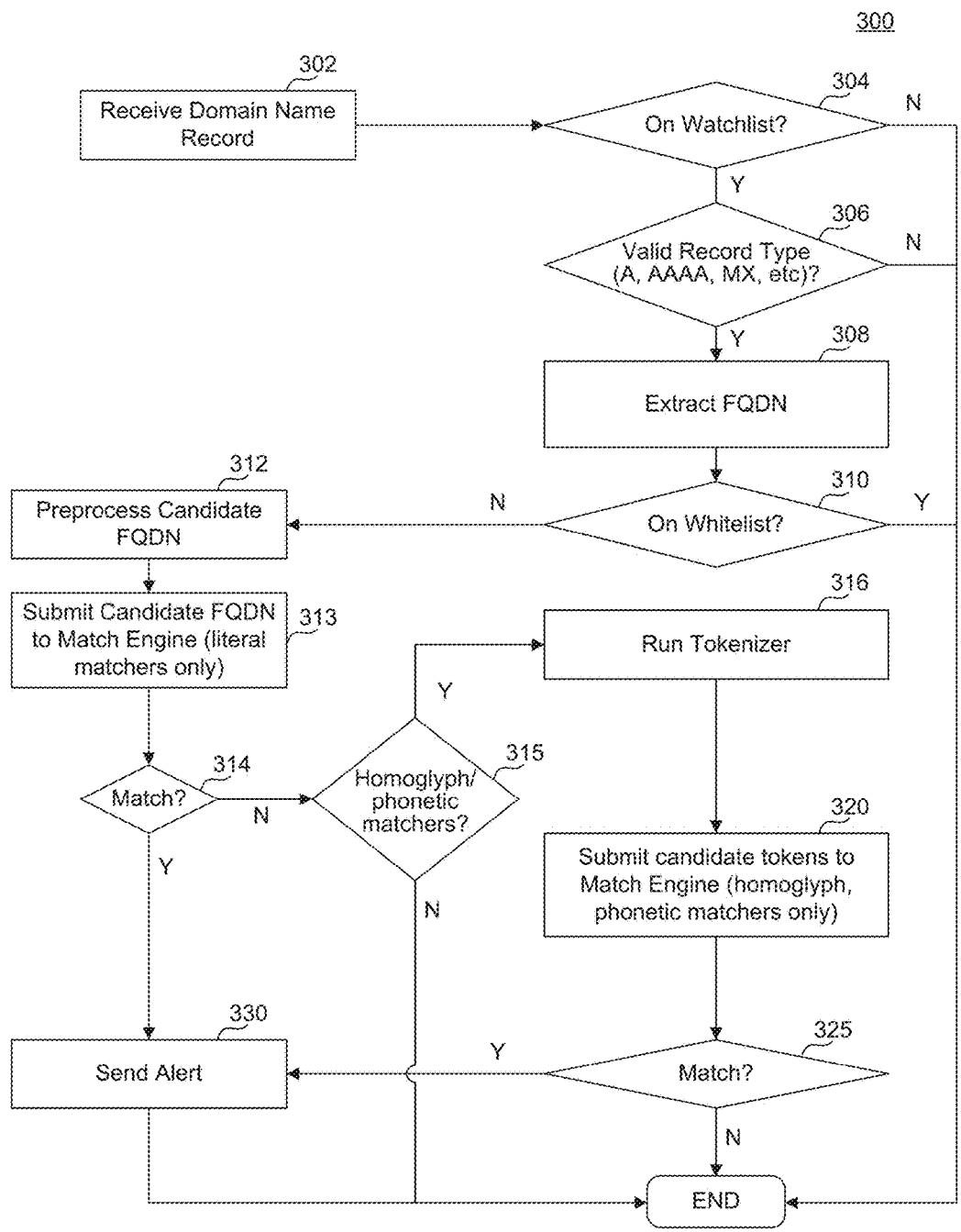
FIG. 3 is a flowchart illustrating a method for detecting DNS name impersonation, according to an embodiment.

FIG. 3 is a flowchart illustrating method 300 executed by system 200 of FIG. 2A for detecting domain name impersonation. The steps of the flowchart will be described with respect to the elements of system 200 when appropriate. Method 300 is described with respect to a single subscriber to the service provided by system 200.

Method 300 begins with the arrival of a new DNS record in step 302. This record may be received from a massive DNS sensor node array that detects new entries into the DNS. In an embodiment, this domain name record may be a full DNS record with a type field that specifies its function. In step 304, the DNS record received in step 302 is submitted to filter module 212 from FIG. 2A where it is first checked against a watchlist for the subscriber, such as watchlist 227 as illustrated in FIGS. 2A and 2B. In an embodiment, watchlist 227 is obtained from a watchlist database, such as watchlist database 225 illustrated in FIG. 2A. If the candidate FQDN does not match any entry within the watchlist, the method ends because the FQDN is not part of a domain name space that the subscriber is interested in. As discussed above relative to FIG. 2A, the watchlist may default to simply including an entry with "*." symbolizing that any FQDN may be of interest to match detection system 210. In such a case, step 304 always results in a match, and the control proceeds to step 306.

In step 306, the DNS record is examined to determine if it is a record of interest to match detection system 210 of FIG. 2A. This examination may occur in the filter module 212, or in some embodiments may occur prior to arriving at match detection system 210, in which case step 306 may not need to be performed. As discussed above, DNS record types that are of interest to the system 200 include record types "A", "AAAA", "CNAME", "PTR", and "MX". In other embodiments, additional record types may be added to the records of interest. If the DNS record type is one of the aforementioned types, then the method 300 continues to step 308. If not, then the method ends.

At step 308, the FQDN is extracted from the DNS record. In an embodiment, this may occur at filter module 212 after the record is determined to be of interest to system 200 at step 306. The format of the FQDN is a simple character string, for example, "www.fars-1ghtsecyu.ritee.com." This FQDN may be an embodiment of FQDN 213 illustrated in FIG. 2A.

At step 310, the FQDN obtained at step 308 is checked against a whitelist for the subscriber, such as whitelist 222 as illustrated in FIGS. 2A and 2B. In an embodiment, whitelist 222 is obtained from the whitelist database 220. If the FQDN matches any entry within the whitelist, including an exact match with an entry of the whitelist or a pattern match with a wildcard entry listed in the whitelist, the method ends because the FQDN is part of a domain name space that the subscriber has instructed match detection system 210 to ignore.

Following the determinations that the FQDN is on the subscriber's watchlist in step 304 and is not on the subscriber's whitelist in step 310, the FQDN can be preprocessed to remove extraneous characters in step 312. As discussed above, the FQDN that is extracted from a new DNS record may contain extraneous characters, dashes in particular, that are meant to fool simple pattern matchers. In step 312, those characters are removed to produce a "preprocessed candidate FQDN", such as preprocessed candidate FQDN 215 of FIG. 2A.

In step 313 the preprocessed candidate FQDN obtained in step 312 can be submitted to the match engine 218 and compared against the subscriber's brandlist. The brandlist of step 313 may be an embodiment of brandlist 242 illustrated in FIG. 2A, and may be stored in a brandlist database, such as brandlist database 240 illustrated in FIG. 2A. As discussed above, the brandlist contains character strings of brands are expressed as ASCII strings specified by the subscriber. In particular, the preprocessed candidate FQDN is first compared against the subscriber's brandlist using literal matching algorithms, which seek to perform string literal and substring matches between the preprocessed candidate FQDN and brands specified by the subscriber. The algorithms are discussed in more detail below. In some embodiments, the original, unprocessed FQDN may also be compared to entries in the brandlist using these literal matching algorithms. If the comparison between an entry in the brandlist and the preprocessed candidate FQDN (or original FQDN) produces a match based on the criteria of the literal matching algorithm being used, then in step 314 a match is detected.

If a match is detected in step 314, then the process moves to step 330, where an alert report is generated and sent to the subscriber. In an embodiment, the alert report may contain information related to the DNS record, including the FQDN, the time the record was detected, which brandlist entry was being impersonated, which algorithm determined the impersonation, and other contextual data that may be pertinent to the subscriber. The subscriber can then take corrective actions as it sees fit. After the alert report is generated and sent, then the process ends.

If a match is not detected in step 314, then the process moves on to step 315, where the match detection system 210 determines if it is configured to run any homoglyph or phonetic matching algorithms. If not, the process ends, and if so, the preprocessed candidate FQDN string generated in step 312 is submitted to the tokenizer in step 316 to generate candidate tokens. The candidate tokens generated in step 316 are an embodiment of candidate tokens 217 illustrated in FIGS. 2A-B. In an embodiment, this may occur within a separate software module, such as tokenizer 216 illustrated in FIG. 2A. The module may be implemented in a similar device or separate device from filter module 212. The preprocessing steps, including the preprocessing step 312 and tokenizer step 316, are described in greater detail below with respect to FIGS. 4A-B, 5 and 6.

In step 320, the candidate tokens generated in step 316 as well as the candidate FQDN generated in step 312 are passed to a match engine, such as match engine 218 as illustrated in FIG. 2A, to determine if any of the candidate tokens represent an attempt to impersonate a brand associated with the subscriber. The match engine 218 applies algorithms that compare each candidate token against the subscriber's brandlist. The algorithms that are applied are specified in an algorithms list, such as algorithm list 232 of FIG. 2A, that are stored in a matching policy database, such as matching policy database 230 of FIG. 2A. In this step, unlike in step 313, a different set of algorithms may be applied, including phonetic matching algorithms and homoglyph matching algorithms. These algorithms are described in more detail below with respect to FIGS. 7, 8A-B, 9A-B and 10A-B.

During step 320, a candidate token is compared to a string from the brandlist using every algorithm in the algorithm list. The algorithm determines if the candidate token is impersonating the brandlist entry (either in whole or in part) based on some criteria specific to the algorithm being used. If the criteria are satisfied, then in step 325, a match is detected and the method moves to step 330, where an alert report is sent to the subscriber to notify the subscriber that an impersonating FQDN has been registered with the DNS. The alert report will contain information related to the DNS record, including the FQDN, the time the record was detected, which brandlist entry was being impersonated, which algorithm determined the impersonation, and other contextual data that may be pertinent to the subscriber. The subscriber can then take corrective actions as it sees fit. If no match is detected after cycling through all of the different candidate tokens, brandlist entries, and algorithms, then the method ends without any report being sent.

A skilled artisan would recognize that there may be many different ways to cycle through the brandlist entries, the candidate tokens, and the algorithms that may result in various speed improvements or other performance benefits. The match engine and the matching algorithms available are discussed in greater detail below with respect to FIGS. 7, 8A-B, 9A-B, and 10A-B.

In an embodiment, each candidate token may be compared against each entry in the subscriber's brandlist using each algorithm specified by the subscriber in the algorithm list, and when a match is detected, an alert report is generated and sent to the subscriber. The ordering of how each list is cycled can vary. For example, in an embodiment, for a single candidate token being investigated, each brandlist entry can be compared to the candidate token using each of the algorithms, after which the next brandlist entry is compared to the candidate token. This continues until the brandlist entries are all compared to the candidate token, after which the next candidate token is selected and the process is repeated for all of brandlist entries and algorithms. If one of the comparisons results in a match being detected, wherein the current candidate token and brandlist entry are determined to be a match based on a criteria of one of the algorithms, then an alert report containing all of the necessary information is sent to the subscriber, and the process is stopped without cycling through any of the other candidate tokens. In an embodiment the alert report may contain the original FQDN obtained in step 308, the candidate token and the brandlist entry that have been determined to match, the algorithm used, the type of the original DNS record received in step 302, time of DNS record being received by the system, and so on.

In another embodiment, the brandlist may be the last thing cycled, where for each brandlist entry, each candidate token is compared using each of the algorithms, after which the next candidate token is compared. After all candidate tokens are compared, the next brandlist entry is selected, and the entire process repeats until either a match is found or all comparisons between each brandlist entry and candidate token have been completed. An alert report is generated and sent to the subscriber if a match is detected, and the process halted.

B. DOMAIN NAME PREPROCESSING AND TOKENIZATION

In this section, the preprocessing and tokenization processes are described. The purpose of preprocessing an FQDN is to obtain strings embedded within an FQDN that may represent an attempt by a nefarious party to imitate a domain name or brand of a subscriber. The preprocessing and tokenization may generate strings that are more easily recognizable to string matching algorithms. For example, a subscriber called "Farsight Security" may have a registered FQDN of "www.farsightsecurity.com." A nefarious party, in an attempt to impersonate this domain name may register a DNS record with FQDN "www.ww.far.s1-ght.sec.yu-rit.ee.com." This second FQDN can clearly be seen to embed a string that may be read as "farsight security" by an unsuspecting internet user, but because of the presence of extraneous periods (indicating new subdomains) and dash characters, a simple string matching algorithm may not determine that this newly registered FQDN is an impersonation attempt by a nefarious party. Thus, the unsuspecting user may be fooled into visiting an IP address associated with that FQDN. The preprocessing and tokenization processes are meant to aide matching algorithms in determining matches between suspected FQDNs and a subscriber's brands and domain names by parsing the suspected FQDN and presenting a set of strings, called candidate tokens, that are composed of sections of the suspected FQDN.

Figure 4A:
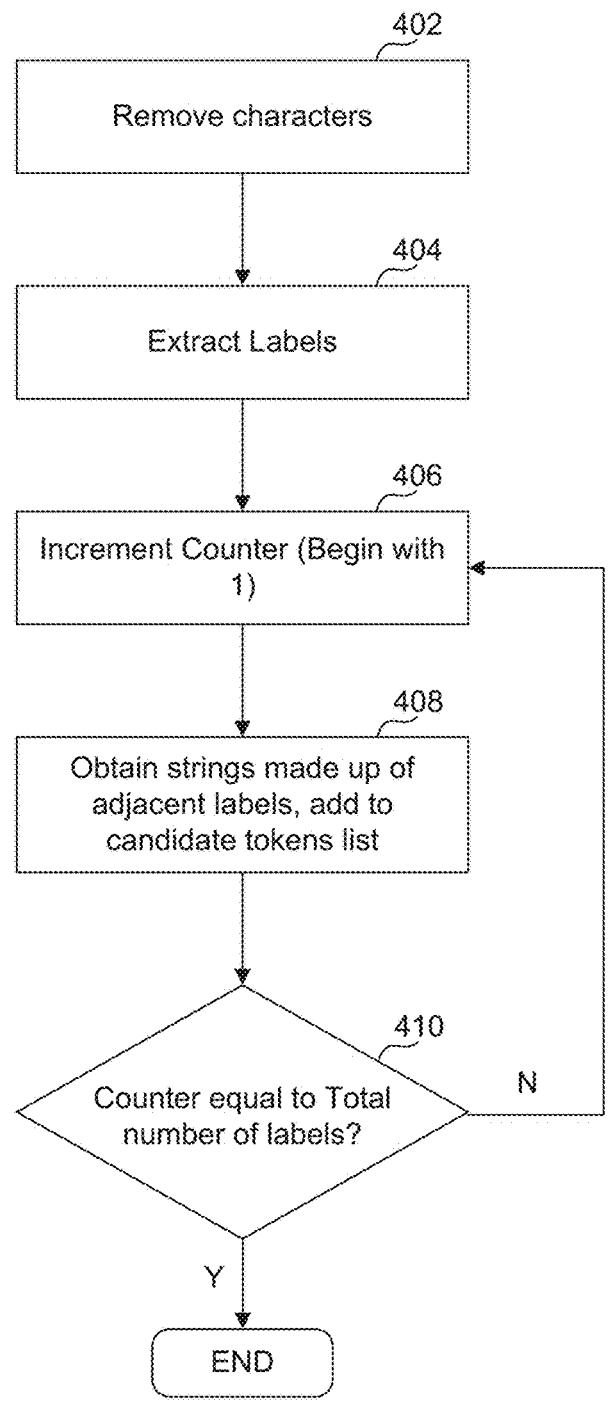
FIGS. 4A-B are flowcharts illustrating DNS name preprocessing and candidate token generation, according to an embodiment.
Figure 4B:
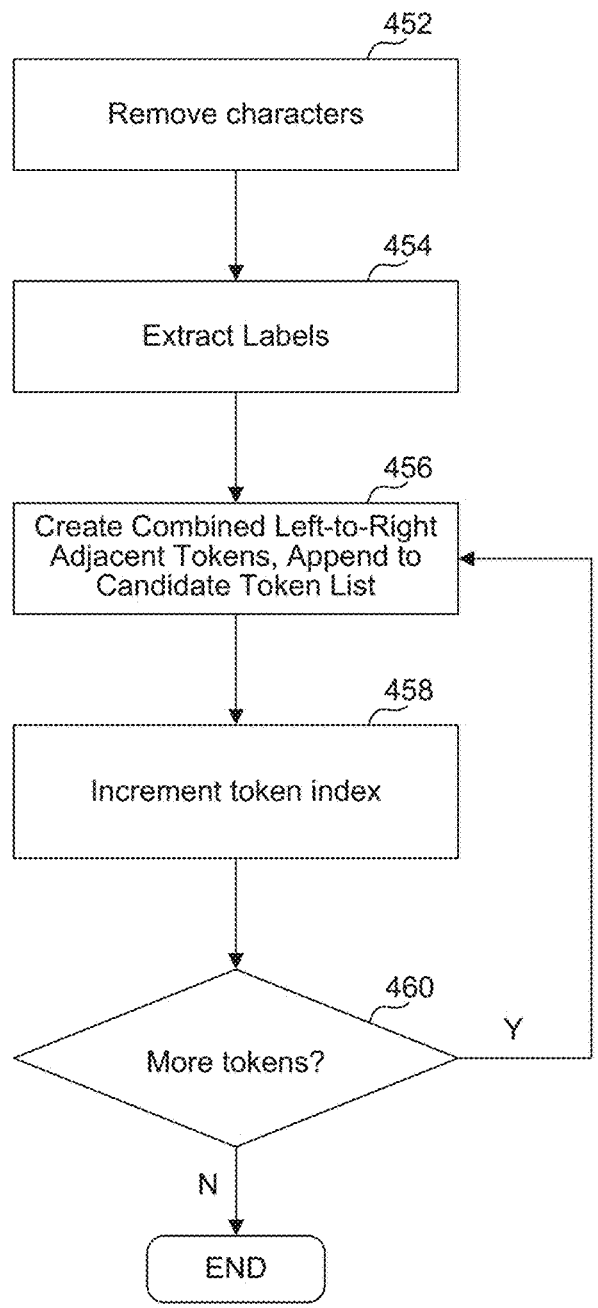

FIGS. 4A-B illustrate different embodiments for the preprocessing and tokenization of the FQDN to generate candidate tokens. FIG. 4A is a flowchart illustrating a method 400 for preprocessing an FQDN to determine the candidate tokens. In an embodiment, method 400 may be executed by a FQDN preprocessor and tokenizer, such as FQDN preprocessor 214 and tokenizer 216 presented in FIG. 2A. Methods 400 may be an embodiment of steps 312 and 316 depicted in FIG. 3.

In step 402, extraneous characters are removed from an original FQDN. The original FQDN may be an embodiment of FQDN 213 of FIG. 2A. Step 402 may be an embodiment of step 312 in FIG. 3. In an embodiment, the characters that are removed are dash characters. As discussed above, dash characters are often added to an FQDN to fool simple string matching algorithms employed to weed out obvious instances of domain name impersonation. This step generates a preprocessed candidate FQDN such as preprocessed candidate FQDN 215 in FIG. 2A. In the example above, the originally received FQDN "www.ww.far.s1-ght.sec.yu-rit.ee.com." may be converted to a preprocessed candidate FQDN "www.ww.far.s1ght.sec.yurit.ee.com." This preprocessed candidate FQDN may be an embodiment of the preprocessed candidate FQDN 215 of FIG. 2A.

In step 404, the first step of the tokenizer begins by taking the preprocessed candidate FQDN generated in step 402 and extracting each DNS label. In an embodiment, the delimiting character "." is what marks the boundaries between different labels in an FQDN. For example, extracting the labels from the preprocessed candidate FQDN "www.ww.far.s1ght.sec.yurit.ee.com." results in 8 labels, "www", "ww", "far", "s1ght", "sec", "yurit", "ee", and "com". These labels may be combined in different left to right adjacent combinations, eventually resulting in candidate tokens that may be matched against a subscriber's brands stored in its brandlist. The labels themselves are also added as candidate tokens.

In step 406, the process of creating the candidate tokens occurs. A counter is initialized to 1. The counter reflects the number of labels generated in step 404 that are to be combined to form a single candidate token. In step 408, candidate tokens are generated by concatenating a number of labels equal to the counter into one string. The labels that form a single candidate token must appear consecutively to each other from left to right in the preprocessed candidate FQDN generated in step 402.

As an example, a candidate FQDN "www.ww.far.s1ght.sec.yurit.ee.com." has 8 labels, "www", "ww", "far", "sight", "sec", "yurit", "ee", and "com". For a counter of 6, a candidate token might be "wwwwwfars1ghtsecyurit", "wwfars1ghtsecyuritee", and "fars1ghtsecyuriteecom", where each candidate token consists of 6 of the labels enumerated above concatenated into one string. The first candidate token "wwwwwfars1ghtsecyurit" concatenates the first 6 labels enumerated above, "www", "ww", "far", "s1ght", "sec", and "yurit." The candidate token "fars1ghtsecyuriteecom" combines the last 6 labels enumerated above, "far", "s1ght", "sec", "yurit", "ee", and "com."

The order in which labels are concatenated to generate a candidate token must be the same as the order that they appear in the candidate FQDN string when read from left to right, and they must appear adjacent to each other in candidate FQDN string separated only by the delimiting character. Therefore, a string containing two labels placed together that did not appear consecutively in the candidate FQDN string would not be a valid candidate token. Referring again to a candidate FQDN "www.ww.far.s1ght.sec.yurit.ee.com.", a string such as "wwwwwfarsecyurit" would not be a valid candidate token, because the string places the non-consecutive labels "far" and "sec" next to each other. A string "wwwwws1ghtfar" would also not be a valid candidate string because it places the labels "far" and "s1ght" in the improper order when compared to the preprocessed candidate FQDN.

Thus, at step 408, for a given counter value, all valid candidate tokens are generated and added to a running list of candidate tokens. For a counter of 1, all labels themselves are considered candidate tokens. When the counter is equal to the number of total labels generated from the preprocessed candidate FQDN, a single candidate token is generated that is the concatenation of every label in the proper order as read in the preprocessed candidate FQDN. At step 410, the counter is checked to determine if it is equal to the total number of labels. If not, steps 406-410 are repeated until all candidate tokens have been generated. The resulting candidate token may be an embodiment of the candidate tokens 217 illustrated in FIG. 2A.

FIG. 4B illustrates another flowchart for a method 450 for preprocessing an FQDN to determine the candidate token strings. In an embodiment, method 450 may be executed by a FQDN preprocessor tokenizer, such as tokenizer 216 presented in FIG. 2A. Method 450 may be an embodiment of steps 312 and 316 depicted in FIG. 3.

Method 450 of FIG. 4B begins in step 452 by removing extraneous characters from a received FQDN to obtain a preprocessed candidate FQDN, and obtaining candidate tokens from the labels of the preprocessed candidate FQDN. These steps are identical to steps 402 and 404 of method 400. Steps 456-460 differ from steps 406-410 from method 400, but result in the same set of candidate tokens. Steps 406-410 generate candidate tokens by creating every possible candidate token made up of a certain number of labels from the preprocessed candidate FQDN. Steps 456-460, on the other hand, generate all of the candidate tokens that begin with a label from the preprocessed candidate FQDN before moving on to the next label. For example, for a preprocessed candidate FQDN of "www.far.sight.com.", in step 454, the first candidate tokens are generated from the labels of the preprocessed candidate FQDN, in this case, "www", "far", "sight", and "com". Steps 456 then generates every candidate token that begins with the label "www": "wwwfarsightcom", "wwwfarsight", and "wwwfar". Then in step 458, the method advances to the next label that appears in the preprocessed candidate FQDN, in this case the label "far". Step 460 would result in looping back to step 456 because the method has not stepped through all of the labels. Then, step 456 would repeat to generate every candidate token that begins with "far": "farsightcom" and "farsight", and the steps 456-460 would repeat once again to generate the candidate token "sightcom".

Thus, FIG. 4A demonstrates a method 400, and FIG. 4B another method 450, which would both generate an identical set of candidate tokens from the same received FQDN. A skilled artisan would recognize that numerous embodiments are possible to generate the candidate tokens.

FIG. 5 illustrates the strings that are generated at each step of the preprocessing method 400. In the figure, the original FQDN 501, "aa-aa-a.b-bbb-b-b.cc-cc-c-.dd-d" is received as part of a new DNS record. This original FQDN 501 may be determined during step 308 depicted in FIG. 3. This FQDN may have various extraneous characters. After the preprocessing step 402, a preprocessed candidate FQDN 502 is generated. In an embodiment, preprocessed candidate FQDN 502 may be fed into the match engine to be compared against a subscriber's brands and domain names, as in step 313 of FIG. 3.

Labels 504 are created by parsing the candidate FQDN based on a delimiting character, in this case a dot, in step 404. In this case, there are four labels 504A-D created. Although in this example they have been generalized to "aaaaa", "bbbbbb", "ccccc", and "ddd", in general these string may represent real subdomains of the DNS.

During steps 406-410, the candidate tokens 508 are generated. The candidate tokens may be an embodiment of the candidate tokens 217 illustrated in FIG. 2A. At level 506A, the counter is equal to 1, and the candidate tokens consisting of one adjacent label are generated, resulting in four candidate tokens 508A-D that are identical to the four labels 504A-D. At 506B, the counter is equal to 2, and candidate tokens 508E-G are generated that are the result of concatenating together two consecutive labels from the preprocessed candidate FQDN 502. Thus, candidate token 508E is a concatenation of labels 504A and 504B, candidate 508F a concatenation of labels 504B and 504C, and 508G a concatenation of labels 504C and 504D. It should be noted that for the preprocessed candidate FQDN 502, these are the only valid candidates generated when the counter is equal to 2, as no other consecutive combinations of two labels exist in candidate FQDN 502.

At level 506C, the counter is equal to 3, and two candidate tokens 508H-I are generated that are concatenations of labels 504A-504C and 504B-504D respectively. Finally, at level 506D, the counter is equal to 4, and only one candidate token 508J is generated which is the concatenation of all labels 504A-D. The candidate tokens 508A-J reflect all of the valid candidate tokens that can be generated from the original FQDN 501. Therefore, the candidate tokens 508 and the two FQDNs 501 and 502 are the strings that the match engine, such as match engine 218 of FIG. 2A, compares to a subscriber's brands and domain names to determine if the FQDN may be considered a domain name impersonation by a nefarious party.

Figure 6:
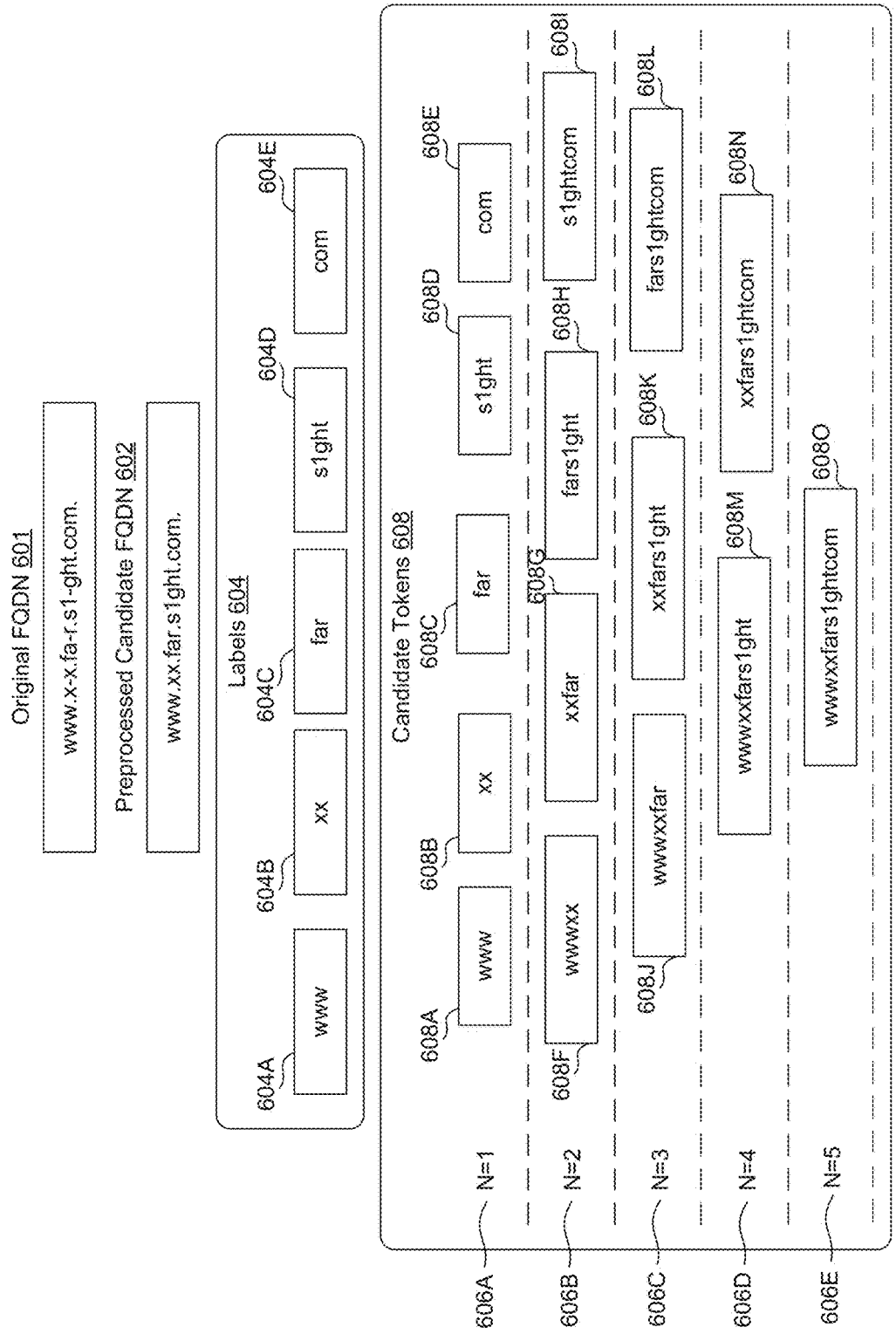
FIG. 6 illustrates an example of how another set of strings is preprocessed.

FIG. 6 illustrates yet another example of the strings that may be generated by a preprocessing module executing method 400, but now for an FQDN that results in five labels rather than four. The strings and their notations are similar to that of FIG. 5—an original FQDN 601, a candidate FQDN 602, labels 604, and candidate tokens 608 generated based on the different instances of the counter, depicted as levels 606A-E. Because the original FQDN 601 now results in five labels delimited by the "." character, the number of candidate tokens 608 is substantially larger than the number of candidate tokens 508 of FIG. 5.

As noted above, several embodiments exist that generate a set of candidate tokens identical to candidate tokens 508 and 608 from FIGS. 5 and 6. For example, method 450 depicted in FIG. 4B would generate the identical set of candidate tokens 508 and 608, albeit without the use of the counter as described with respect to step 406 from method 400. A skilled artisan would recognize that many alternative methods may exist to generate the candidate tokens.

Two observations of importance are illustrated by FIG. 6. First, FIG. 6 illustrates the importance of the candidate tokens being made up of consecutive, adjacent labels from the preprocessed candidate FQDN, and that these labels be concatenated in the order in which they appear in the candidate FQDN (such as preprocessed candidate FQDN 602). Because the purpose of domain name impersonation is to trick unsuspecting users into associating the impersonating domain name with the subscriber, the original FQDN 601 that the nefarious party may register with the DNS will attempt to imitate the brands and domain names associated with that subscriber, as this would be most likely to trick the unsuspecting user. Therefore, candidate tokens such as 608H ("fars1ght") and 608L ("fars1ghtcom") reflect a phrase close to the subscriber's brand name "Farsight". On the other hand, a string like "s1ghtfar", which is made up of labels of the preprocessed candidate 602 FQDN concatenated out of order, may be much less likely to trick a user, or may reflect a brand name of a different legitimate entity. Thus, the requirement that the candidate tokens be made up of consecutive, adjacent and properly ordered tokens serves as a basic filter against over-sensitivity of the domain name impersonation detection system. Methods 400 and 450 from FIG. 4A and FIG. 4B respectively both create candidate token sets that would reflect the consecutive Second, the number of candidate tokens is a function of the number of labels generated by parsing the candidate FQDN. Specifically, the number of candidate tokens is a "triangular number" that is based on the number of labels from the preprocessed candidate FQDN:

$$N = \text{Number of Labels from Preprocessed Candidate } FQDN,$$

$$\text{Number of Candidate Tokens} = \sum_{x=1}^{N} x = \frac{N(N+1)}{2} = \binom{N+1}{2}$$

C. MATCH ENGINE AND ALGORITHMS

Figure 7:
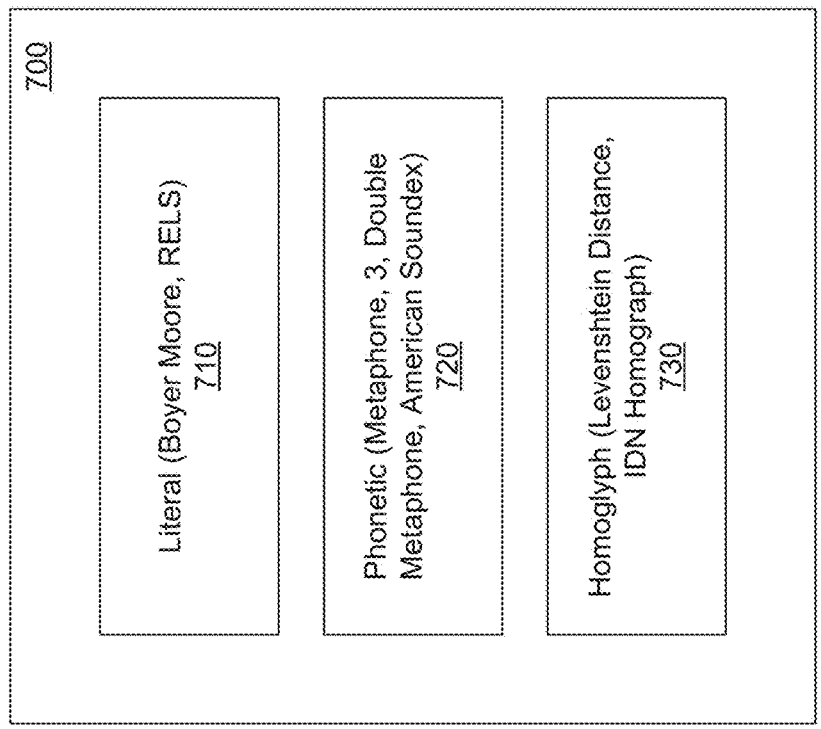
FIG. 7 illustrates the modules for matching two strings, according to embodiments.

FIG. 7 depicts match engine 700. Match engine 700 may be an exemplary embodiment of the match engine 218 that appears in FIG. 2A, and may perform step 320 of method 300 illustrated in FIG. 3. The match engine compares a candidate string, such as one of the candidate tokens 217 or FQDNs 213 and 215 depicted in FIG. 2A, and a subscriber brand that may appear on a subscriber's brandlist, such as the brandlist 242 of FIG. 2A.

In an exemplary embodiment, the match engine may contain software instructions for executing three classes of matching algorithms, literal algorithms 710, phonetic algorithms 720, and homoglyph algorithms 730. Each of these algorithm classes follows a different principle of matching a candidate tokens (or the candidate FQDN) to a subscriber's brands and domain names, such as the entries of brandlist 242. Generally, literal algorithm class 710 attempts to find literal string matches between a candidate token (or FQDN) and a subscriber brand, phonetic algorithm class 720 determines if the pronunciation of a candidate token (or FQDN) is similar to a subscriber brand, and homoglyph algorithm class 730 determines if a candidate token (or FQDN) has a similar textual appearance to a subscriber brand or domain name.

Literal algorithm class 710 includes software for executing two specific algorithms, Boyer-Moore matching and so-called "Leet Speak" matching. Phonetic algorithm class 720 includes software for executing three specific algorithms, Double Metaphone matching, Metaphone 3 matching, and American Soundex matching. Finally, the homoglyph class includes software for executing two specific algorithms, Levenshtein Distance matching and International Domain Name (IDN) homograph matching. Each of these algorithms is described in detail below with respect to FIGS. 8A-B, 9A-C, and 10A-B.

FIGS. 8A-B illustrate the algorithms of literal algorithm class 710 depicted in FIG. 7. As discussed above, the literal algorithm class represented by FIGS. 8A-B seek to determine if a string literal match exists between a search string and a target string—in other words, these algorithms determine if a search string exists as an exact or near-exact substring in a target string. As used in the domain name impersonation system 200 of FIG. 2A, the purpose is to determine if a substring within an original FQDN, a preprocessed FQDN, or a candidate token is an exact match with a subscriber brand (with an exception as will be explained below), in which case the owner of the original FQDN may be trying to impersonate the subscriber brand.

FIG. 8A illustrates the Boyer-Moore matching algorithm. FIG. 8A displays a subscriber brand 802, FQDN 804A of a new DNS record, the preprocessed FQDN 804B (where all dashes are removed), and candidate tokens 806A-E based on the preprocessed FQDN 804B. The candidate tokens 806A-E may be generated by the tokenizer 216 from FIG. 2A executing method 400 from FIG. 4A or method 450 from FIG. 4B. Candidate tokens 806A-E do not represent the entirety of the candidate tokens generated based on the FQDN 804B.

The Boyer-Moore algorithm is an optimized string matching algorithm from literal algorithm class 710 that performs pure substring matching, where the algorithm produces a match if a search string identically matches a substring within a target string. In an exemplary embodiment, match engine 700 executes this algorithm with the search string as subscriber brand 802 and the target string as any of the FQDNs 804A-B or candidate tokens 806A-E. In an exemplary embodiment, only the FQDNs 804A and 804B are compared to the brand 802 using the Boyer-Moore algorithm. In other embodiments, the candidate tokens 806A-E may also be compared to the brand using the Boyer-Moore algorithm. As can be seen, both candidates 806A and 806C produce matches in the Boyer-Moore algorithm because subscriber brand 802 ("farsight") appears exactly in candidates 806A and 806C. In an embodiment, Boyer-Moore is also cap-insensitive, meaning that each character of the subscriber brand 802 need not be matched in terms of letter case (capital or lower-case), just in the actual letter that the character represents (e.g. "fArsIghtcom" will still produce a match from search string "farsight"). Note, however, that FQDNs 804A-B would not produce matches when compared against subscriber brand 802 in the Boyer-Moore algorithm because of extraneous periods.

FIG. 8B illustrates another algorithm called the "Leet Speak" matching algorithm. Leet Speak is another algorithm from literal algorithm class 710 that is similar to Boyer-Moore of FIG. 8A the Leet Speak algorithm produces a match if a search string matches a substring within a target string. However, in this case, the search string may be expressed as a regular expression, where certain characters within the search string can be represented by several other characters which are known to be substitutes for other characters.

FIG. 8B illustrates a subscriber brand 822, original FQDN 824A of a new DNS record, preprocessed FQDN 824B (where all dashes are removed), and candidate tokens 826A-E based on preprocessed FQDN 824B. In an exemplary embodiment, only the FQDNs 804A and 804B are compared to the brand 802 using the Leet Speak algorithm. In other embodiments, the candidate tokens 806A-E may also be compared to the brand using the Leet Speak algorithm. In addition to these strings, a modified search string 823 is displayed. Modified search string 823 is a string formatted as a regular expression, which allows for certain characters to be replaced by other characters that appear similar. For example, the letter "a" is often replaced with the "4" character in certain contexts (particularly internet chat rooms, online video games, and so on), and such practice may also be exploited by a nefarious party when registering an FQDN to impersonate a company's brand. Similarly, the letter "i" may be replaced by a letter "l" or a "1" digit character. The Leet Speak algorithm allows a search string to encompass all of the combinations of those common character substitutions.

Modified search string 823 represents this ability to search for a character or its substitution by bracketing together all characters that may represent each other. This notation is often referred to as a "character class." For example "[a4]" means that the "a" character may be replaced by a "4" character, "[i1l]" means that the "i" character might be replaced by the "1" or "l" characters, "[s5]" means that the "s" character may be replaced by a "5" character, and so on. Thus, modified search string 823 represents subscriber brand 822 with any of these characters (or none of them) interchanged with their common substitutions. Thus, as can be seen in FIG. 8B, the candidate 826A contains as a substring "fars19htsecuri7y" and generates a match, because the modified search string 823 allows for the "g" character to be replaced by a "9" character and the "i" character to be replaced by the "1" character. Similarly, candidate 826C also contains the "fars19ht" string, and also generates a match. Two things should be noted in the Leet Speak algorithm: (i) a regular occurrence of the string "farsight" in a candidate also produces a match, and (ii) the extraneous period characters in both FQDNs 824A and 824B still prevent those FQDNs from generating matches in the Leet Speak algorithm.

As discussed above, in embodiments the literal algorithms, including the Boyer-Moore and the Leet Speak algorithms, both may be applied to the original FQDN and a preprocessed FQDN to determine if a match is generated.

FIGS. 9A-B illustrate the algorithms of phonetic algorithm class 720 depicted in FIG. 7. As discussed above, the phonetic algorithm class represented by FIGS. 9A-B seek to determine if two words have similar pronunciation. As used in the domain name impersonation system 200 of FIG. 2A, the purpose is to determine if a portion of a domain name has a similar pronunciation to a subscriber brand, in which case the domain name may an attempt to impersonate the subscriber brand.

FIG. 9A illustrates the "American Soundex" algorithm. The American Soundex algorithm processes a string to produce a code that represents the pronunciation of the string. In the context of the match engine 218 of FIG. 2A, the algorithm is used to process both a subscriber brand and a candidate token, at which point their respective codes are compared to see if they are identical. If so, the algorithm generates a match, and the match engine may generate an alert report. FIG. 9A depicts a subscriber brand 902, an original FQDN 904A and preprocessed FQDN 904B (dashes removed), as well as a candidate token 906. After being processed by the American Soundex algorithm, both the subscriber brand 902 and the candidate token 906 have respective codes 903 and 907. Because those codes match (both codes being "F622"), the match engine generates a match, and an alert report may be sent out as a result of the match.

The American Soundex algorithm generates a four-character code based primarily on the consonants of the string. The first character of the code is the first letter of the string being processed by the algorithm. The next three characters of the code are dictated by the presence of certain characters in the string when read from left to right. For example, the letters "b", "f", "v", and "p" map to a value of 1, while character "r" maps to a value of 6. Thus, for every instance of a "b", "f", "v", or "p" that appears, a "1" character is added to the four-character code. Likewise, for every instance of an "r" character within the string, a "6" character is added to the four-digit code. There are several exceptions to these rules depending on repetition of characters within the string. The process stops once four-characters are reached, regardless of how much of the string remains.

FIG. 9B illustrates both the Double Metaphone and Metaphone 3 algorithms. An original algorithm, simply called the Metaphone algorithm, behaves similar to the American Soundex algorithm in that a code is generated based on the pronunciation of the word. The Metaphone algorithm is significantly more complex than the American Soundex algorithm. The Double Metaphone and Metaphone 3 algorithms are both enhancements of the original Metaphone algorithm. Specifically, the Metaphone 3 algorithm is an optimized form of the Double Metaphone algorithm, which in turn is an augmented form of the Metaphone algorithm. Both the Double Metaphone and the Metaphone 3 algorithms generate two codes based on a string, rather than one code as occurs in both the American Soundex and the Metaphone algorithm. In the context of the match engine 218 of FIG. 2A, the algorithm is used to process both a subscriber brand and a candidate token, at which point their respective pairs of codes are compared to determine if the candidate token is impersonating the subscriber brand.

FIG. 9B depicts subscriber brand 922, original FQDN 924A and preprocessed FQDN 924B (dashes removed), and a candidate token 926. The subscriber brand is processed by either the Double Metaphone algorithm or the Metaphone 3 algorithm to generate a pair of codes 923A and 923B, and candidate token 926 is processed similarly to generate a pair of codes 927A and 927B. In an embodiment, each code of the subscriber brand must match its corresponding code for the candidate token to generate a match. In another embodiment, only one code of the subscriber brand need match its corresponding candidate token code to generate a match. In another embodiment, one code of the subscriber brand need only match either code of the candidate token to generate a match.

Figure 10A:
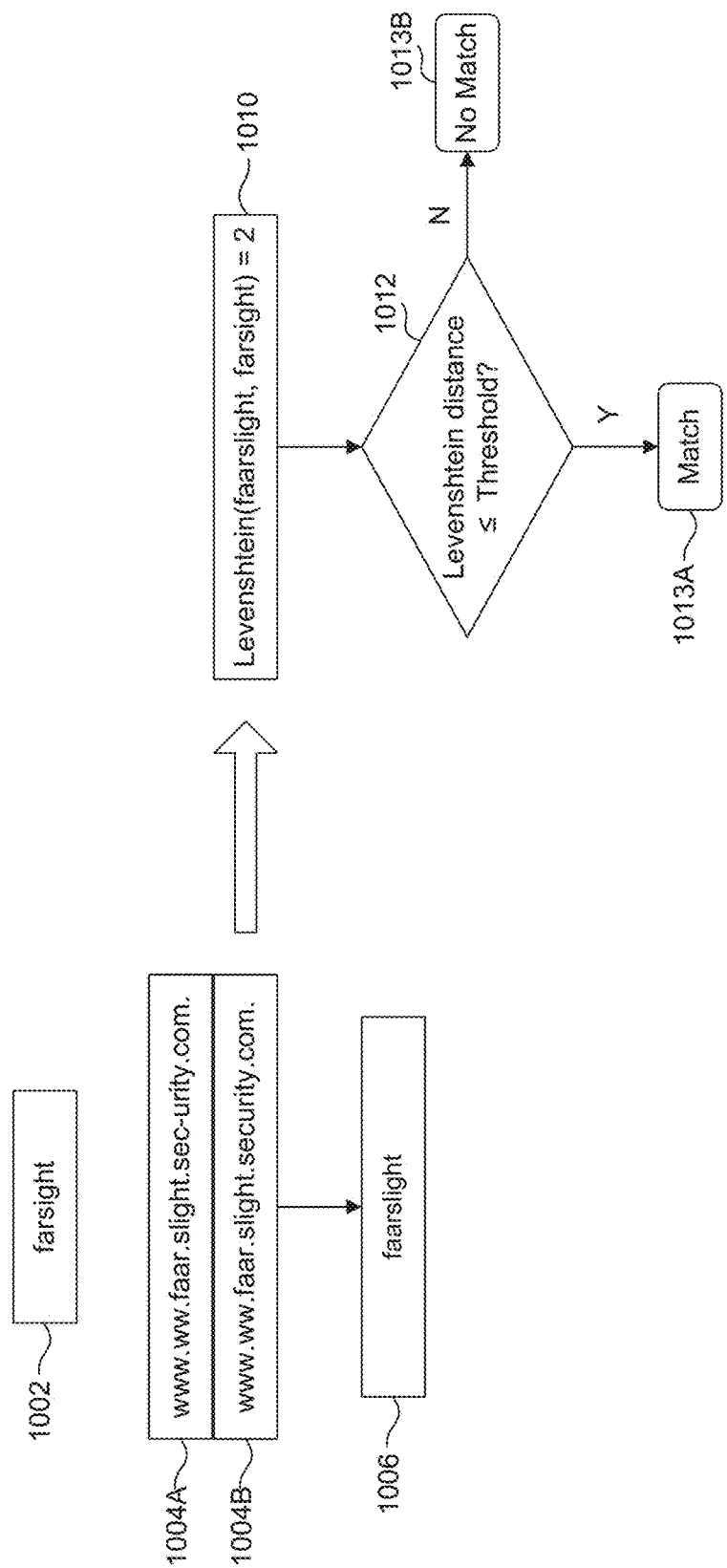
FIGS. 10A-B illustrate a class of matching algorithms that looks for homoglyph matches between strings, according to embodiments.
Figure 10B:
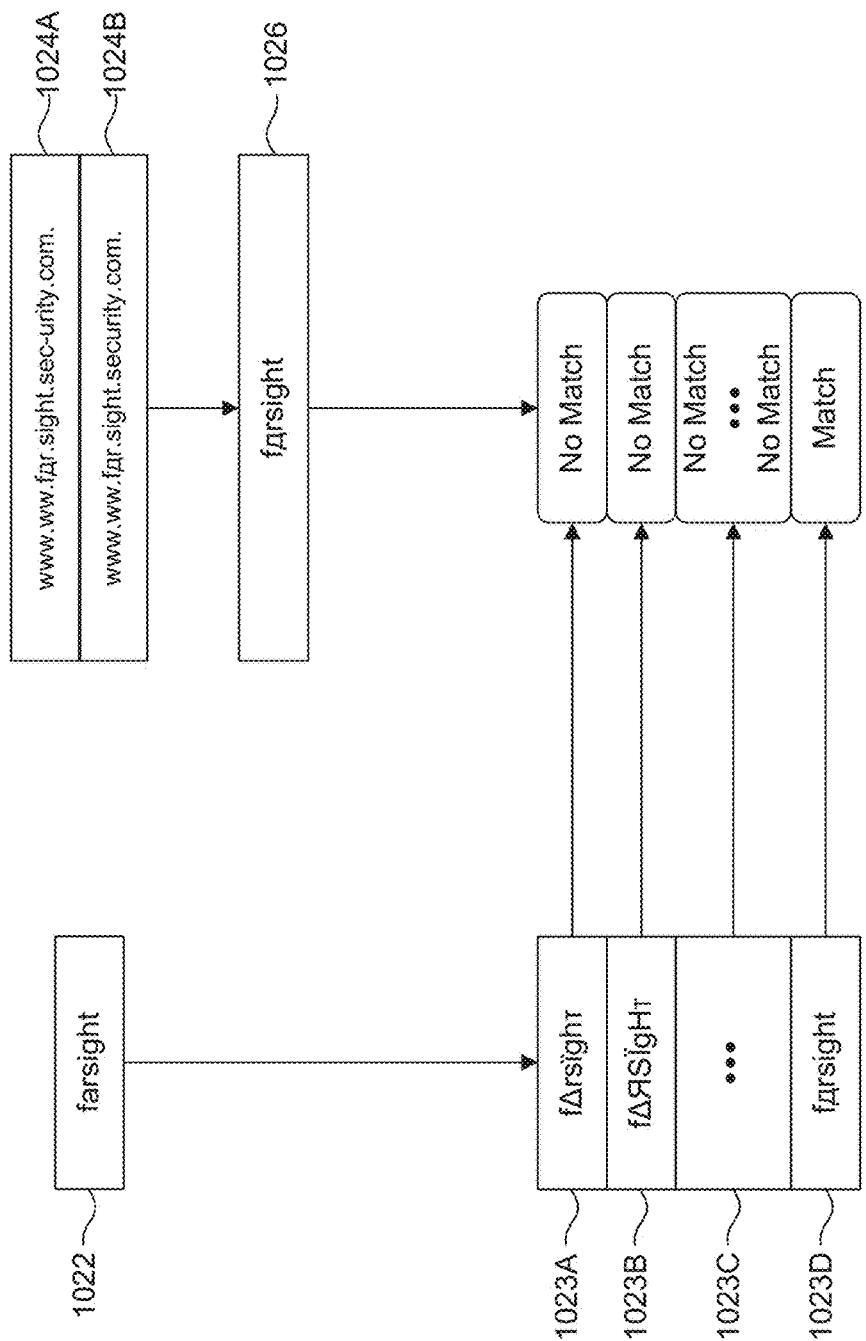

FIGS. 10A-B illustrate the algorithms of homoglyph algorithm class 730 depicted in FIG. 7. As discussed above, algorithms of the homoglyph algorithm class represented by FIGS. 10A-B seek to determine if a target string looks like a search string. As used in the domain name impersonation system 200 of FIG. 2A, the purpose is to determine if a substring within an original FQDN, a preprocessed FQDN, or a candidate token has a similar appearance to a subscriber brand, in which case the owner of the original FQDN may be trying to impersonate the subscriber brand.

FIG. 10A illustrates the "Levenshtein Distance" algorithm. The Levenshtein Distance algorithm accepts two character strings and determines a "distance" score that reflects how dissimilar the two character strings are. The distance score is an integer greater than or equal to zero, and reflects the number of edits that would be required to make its string inputs identical to each other. For this reason, the distance score is sometimes referred to as the "edit distance". For example, the string "farsight" and "faarsight" have a distance score of 1, and the string "farsight" and "forsight" also have a distance score of 1, because both require exactly one edit to make the strings identical (in the former case, deletion of an "a" character in the second string, and in the latter case, replacing the "o" character in the second string with an "a" character). In the context of match engine 218 of FIG. 2A, the algorithm is used to produce a distance score based on a subscriber brand and a candidate token, at which point the score is compared to a threshold specified by the subscriber. If the distance is smaller than or equal to the threshold, then the algorithm generates a match.

FIG. 10A depicts a subscriber brand 1002, FQDN 1004A, preprocessed FQDN 1004B, and a candidate token 1006. The subscriber brand 1002 and the candidate token 1006 are fed into a Levenshtein Distance calculator, at which point a distance score 1010 is generated. If the Levenshtein distance is smaller than a threshold, then a match is generated indicating that the FQDN is attempting to impersonate a subscriber brand or domain name.

FIG. 10B illustrates an International Domain Name (IDN) Homograph algorithm. Internationalized Domain Names (IDNs) are domain names that may use non-Latin alphabetic characters, representing alphabets such as Cyrillic, Greek and Armenian. Because the number of characters is many times larger than the number of Latin characters, the characters are encoded in Unicode instead of ASCII. Although IDNs have the appearance of domain names (being formatted with domain labels delineated by periods), because they contain non-Latin characters that are encoded in Unicode, the entire IDN string must also be encoded using Unicode. Although DNS is only designed to work with character strings encoded in ASCII, an application infrastructure has been developed and is widely available which translates Unicode domain names into ASCII domain names. This allows the IDNs to be translated into network addresses by the DNS just as FQDNS are, in a manner that is essentially transparent to common internet users.

In the context of domain name impersonation, characters from non-Latin alphabets often resemble Latin characters, and may be used by a nefarious party to create domain names that have a similar appearance to a subscriber brand. These domain names are coded as Unicode strings that include non-Latin alphabet characters. For example, the Cyrillic character "A" may be used to replace a Latin letter "A", a Greek character "r" may be used to replace a Latin letter "t", and so on. While the applications available to a user (such as a web browser or email application) will present the IDN as a regular character string, such as "www.fursightsecuriy.com", at the DNS the IDN will be translated to an ASCII Punycode string that results in a different IP address translation. Thus, the IDN Homograph algorithm detects attempts to impersonate a subscriber brand using an IDN with non-Latin characters.

The algorithm is depicted in FIG. 10B. Specifically, FIG. 10B depicts a subscriber brand 1022, domain name 1024A, preprocessed domain name 1024B (dashes removed), and a candidate token 1026. Notice that domain name 1024A contains a Cyrillic character "A", and therefore the domain names 1024A and 1024B are in fact IDNs. The preprocessing and tokenization of the original IDN can occur in much the same way as that of a typical FQDN encoded in ASCII, with any operations adjusted to execute for Unicode-encoded strings rather than ASCII strings. The original IDN and preprocessed IDN 1024A-B are Unicode strings, as is the candidate token 1026. The match engine 218 will also generate multiple Unicode strings 1023A-D for the subscriber brand 1022, where each Unicode string 1023A-D replaces one or more characters within ASCII-encoded subscriber brand 1022 with a non-Latin character. It should be noted that the number of Unicode strings in this embodiment is non-limiting—a huge quantity of Unicode strings may exist based on the subscriber brand 1022.

The Unicode strings 1023A-D will be generated based on a predetermined massive database mapping Latin characters to non-Latin characters. This database can be initiated and updated regularly, using optical character recognition (OCR) to obtain mappings between non-Latin and Latin characters based on how similar they appear.

Using the Unicode strings 1023A-D and the candidate token 1024, numerous comparison types may take place. In one embodiment, the ASCII Punycode translations for both the Unicode strings 1023A-D and the candidate token 1026 can be compared using the various algorithms described above to determine if there is a match. The ASCII Punycode translations convert Unicode strings into ASCII-encoded strings that include several characters to represent a single non-Latin Unicode character.

In other embodiments, the same or similar matching algorithms as those discussed above may be applied here but adapted for Unicode strings. In one embodiment, a direct substring match can be executed similar to Boyer-Moore, where a Unicode version of Boyer-Moore may be used. In another embodiment, the Levenshtein Distance algorithm may be applied in much the same way as is done for ASCII strings, with a match occurring and an alert report being generated if the distance score between one of the Unicode strings 1023A-D and candidate token 1026 is greater than some value. For example, in FIG. 10B, Unicode string 1023D would match the candidate token 1024 under any of these algorithms.

In yet another embodiment, rather than generating a set of Unicode strings 1023A-E from the subscriber brand 1022, a set of ASCII strings may be generated from candidate token 1026. Those ASCII strings can then be matched against the subscriber brand 1022 based on the other algorithms depicted in match engine 700, including the algorithms of literal algorithm class 710, phonetic algorithm class 720, or the Levenshtein Distance algorithm (homoglyph algorithm class 730).

D. CONCLUSION

The databases disclosed herein may be any stored type of structured memory, including a persistent memory. In examples, this database may be implemented as a relational database or file system.

Each of the processors and modules in FIGS. 2A, 2B and 7 may be implemented in hardware, software, firmware, or any combination thereof implemented on a computing device. A computing device can include, but is not limited to, a device having a processor and memory, including a tangible, non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for determining when a Domain Name System (DNS) name string is impersonating a name of interest, comprising:
    a database that stores the name of interest and an allowed name;
    a filtering module configured to determine whether the DNS name string matches the allowed name;
    a preprocessing module configured to, when the filtering module determines that the DNS name string does not match the allowed name, remove instances of a character type that appear within the DNS name string to generate a processed DNS name string,
    a tokenizer module configured to, when the filtering module determines that the DNS name string does not match the allowed name, generate a candidate string based on the processed DNS name string such that the candidate string differs from the DNS name string but reads similar to the DNS name string; and
    a match engine that stores a plurality of matching algorithms, each of the plurality of matching algorithms comparing two strings to determine if they match, the match engine configured to (i) receive the candidate string from the tokenizer module, (ii) for at least one of the plurality of matching algorithms, process the candidate string and the name of interest with the matching algorithm to determine whether the candidate string matches the name of interest based on a criteria associated with the matching algorithm, and (iii) when the candidate string is determined (ii) to match the name of interest, generate an alert report indicating that the DNS name string impersonates the name of interest.

2. The system of claim 1, wherein the match engine repeats the processing (ii) for respective algorithms in the plurality of matching algorithms until the candidate string is determined to match the name of interest.

3. The system of claim 1, wherein the match engine is further configured to (iv) determine whether the DNS name string includes a substring identical to the name of interest, and (v) when the DNS name string is determined to include a substring identical to the name of interest, generate the alert report.

4. The system of claim 1, wherein the filtering module is further configured to:
    (iii) receive a DNS record including the DNS name string and a DNS record type;
    (iv) determine whether the DNS record is of interest based on the DNS record type; and
    (v) when the DNS record is determined to be of interest, determine whether the DNS name string matches one of a plurality of allowed names, wherein the database stores the plurality of allowed names.

5. The system of claim 4, wherein the filtering module is configured to determine (iv) whether the DNS record is of interest based on the DNS record type being one of "A", "AAAA", "MX", "PTR" and "CNAME".

6. The system of claim 5, wherein the filtering module is configured to determine (iv) whether the DNS record is of interest in near real time after the filtering module receives (iii) the DNS record.

7. The system of claim 4, further comprising:
    a DNS sensor node communicatively coupled to a DNS server, configured to (i) detect a query received by the DNS server, the query requesting an address translation of the DNS name string, (ii) generate the DNS record based on the query, and (iii) send the DNS record to the filter module.

8. The system of claim 7, wherein the DNS sensor node sends (iii) the DNS record to the filter module in near real time after the DNS sensor node generates (ii) the DNS record.

9. The system of claim 1, wherein the character type is a dash character.

10. A method for determining when a Domain Name System (DNS) name string is impersonating a name of interest, comprising:
    (i) determining whether the DNS name string matches an allowed name;
    in response to determining (i) that the DNS name string does not match the allowed name:
        (ii) removing instances of a character type that appear within the DNS name string to generate a processed DNS name string; and
        (iii) generating a candidate string based on the processed DNS name string such that the candidate string differs from the DNS name string but reads similar to the DNS name string;
    (iv) for at least one of a plurality of matching algorithms, processing the candidate string and the name of interest with the matching algorithm to determine whether the candidate string matches the name of interest based on a criteria associated with the matching algorithm; and
    (v) when the candidate string is determined (iv) to match the name of interest, generating an alert report indicating that the DNS name string impersonates the name of interest.

11. The method of claim 10, wherein the processing (iv) is repeated for respective algorithms in the plurality of matching algorithms until the candidate string is determined to match the name of interest.

12. The method of claim 10, further comprising:
    (vi) determining whether the DNS name string includes a substring identical to the name of interest, and (vii) when the DNS name string is determined to include the substring identical to the name of interest, generating the alert report.

13. The method of claim 10, further comprising:
(vi) receiving a DNS record including the DNS name string and a DNS record type;
(vii) determining whether the DNS record is of interest based on the DNS record type; and
(viii) when the DNS record is determined to be of interest, determining whether the DNS name string matches one of a plurality of allowed names.

14. The method of claim 13, wherein the determining (vii) whether the DNS record is of interest is based on the DNS record type being one of "A", "AAAA", "MX", "PTR" and "CNAME".

15. The method of claim 14, wherein the determining (vii) whether the DNS record is of interest is in near real time after the DNS record is received (vi).

16. The method of claim 13, wherein the DNS record is received (vi) from a DNS sensor node that detects a query received by a DNS server and generates the DNS record based on the query, the query requesting an address translation of the DNS name string from the DNS server.

17. The method of claim 16, wherein the DNS record is received (vi) in near real time after the DNS sensor generates the DNS record.

18. The method of claim 10, wherein the character type is a dash character.

19. A non-transitory computer-readable medium having instructions stored thereon that, when executed by at least one computing device, causes the at least one computing device to perform a method for determining when a Domain Name System (DNS) name string is impersonating a name of interest, the method comprising:
(i) determining whether the DNS name string matches an allowed name;
in response to the determining (i):
(ii) removing instances of a character type that appear within the DNS name string to generate a processed DNS name string; and
(iii) generating a candidate string based on the processed DNS name string such that the candidate string differs from the DNS name string but reads similar to the DNS name string;
(iv) for at least one of a plurality of matching algorithms, processing the candidate string and the name of interest with the matching algorithm to determine whether the candidate string matches the name of interest based on a criteria associated with the matching algorithm; and
(v) when the candidate string is determined (iv) to match the name of interest, generating an alert report indicating that the DNS name string impersonates the name of interest.

20. The non-transitory computer-readable medium of claim 19, wherein the processing (iv) is repeated for respective algorithms in the plurality of matching algorithms until the candidate string is determined to match the name of interest.

21. The non-transitory computer-readable medium of claim 19, the method further comprising:
(vi) determining whether the DNS name string includes a substring identical to the name of interest, and
(vii) when the DNS name string is determined to include a substring identical to the name of interest, generating the alert report.

22. The non-transitory computer-readable medium of claim 19, the method further comprising:
(vi) receiving a DNS record including the DNS name string and a DNS record type;
(vii) determining whether the DNS record is of interest based on the DNS record type; and
(viii) when the DNS record is determined to be of interest, determining whether the DNS name string matches one of a plurality of allowed names.

23. The non-transitory computer-readable medium of claim 22, wherein the determining (vii) whether the DNS record is of interest is based on the DNS record type being one of "A", "AAAA", "MX", "PTR" and "CNAME".

24. The non-transitory computer-readable medium of claim 23, wherein the determining (vii) whether the DNS record is of interest is in near real time after the DNS record is received (vi).

25. The non-transitory computer-readable medium of claim 22, wherein the DNS record is received (vi) from a DNS sensor node that detects a query received by a DNS server and generates the DNS record based on the query, the query requesting an address translation of the DNS name string from the DNS server.

26. The non-transitory computer-readable medium of claim 25, wherein the DNS record is received (vi) in near real time after the DNS sensor generates the DNS record.

27. The non-transitory computer-readable medium of claim 19, wherein the character type is a dash character.

* * * * *